(12) United States Patent
Shin et al.

(10) Patent No.: US 9,088,788 B2
(45) Date of Patent: Jul. 21, 2015

(54) METHOD OF DISPLAYING A THREE DIMENSIONAL IMAGE AND DISPLAY APPARATUS FOR PERFORMING THE METHOD

(71) Applicant: Samsung Display Co., LTD., Yongin, Gyeonggi-Do (KR)

(72) Inventors: Kyoung-Ju Shin, Hwaseong-si (KR); Jung-Won Kim, Seoul (KR); Cheol-Woo Park, Suwon-si (KR); Hee-Soon Jeong, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 175 days.

(21) Appl. No.: 13/844,262

(22) Filed: Mar. 15, 2013

(65) Prior Publication Data
US 2014/0028740 A1    Jan. 30, 2014

(30) Foreign Application Priority Data
Jul. 24, 2012 (KR) ......................... 10-2012-0080539

(51) Int. Cl.
G09G 5/00 (2006.01)
H04N 13/04 (2006.01)
G09G 3/00 (2006.01)
G09G 3/36 (2006.01)
H04N 13/00 (2006.01)

(52) U.S. Cl.
CPC ............... *H04N 13/04* (2013.01); *G09G 3/003* (2013.01); *G09G 3/3648* (2013.01); *H04N 13/0434* (2013.01); *H04N 13/0438* (2013.01); *H04N 13/0497* (2013.01); *G09G 2310/0283* (2013.01); *G09G 2310/063* (2013.01); *G09G 2320/0209* (2013.01); *G09G 2320/0252* (2013.01); *G09G 2320/0271* (2013.01); *G09G 2320/0285* (2013.01); *G09G 2340/0435* (2013.01); *G09G 2340/16* (2013.01); *H04N 13/0011* (2013.01); *H04N 13/0029* (2013.01)

(58) Field of Classification Search
CPC . G09G 3/2014; G09G 3/2022; G09G 3/2029; G09G 2320/0247; G09G 2320/0266
USPC ............. 348/51, 42, 4, 19; 345/204, 419, 619
See application file for complete search history.

(56) References Cited

U.S. PATENT DOCUMENTS

| | | | |
|---|---|---|---|
| 2011/0090319 A1* | 4/2011 | Kim et al. ...................... | 348/51 |
| 2011/0116166 A1 | 5/2011 | Jung et al. | |
| 2011/0157260 A1* | 6/2011 | Pyun et al. ..................... | 345/691 |
| 2011/0234776 A1* | 9/2011 | Hanari ............................ | 348/56 |
| 2011/0304658 A1 | 12/2011 | Park et al. | |
| 2012/0033053 A1 | 2/2012 | Park et al. | |

* cited by examiner

*Primary Examiner* — Shaheda Abdin
(74) *Attorney, Agent, or Firm* — Innovation Counsel LLP

(57) ABSTRACT

A method of displaying a three-dimensional image, the method includes sequentially displaying a first three-dimensional image on a plurality of horizontal lines of a display panel along a scan direction, and simultaneously displaying a black image on the horizontal lines of the display panel, the black image being inserted between the three-dimensional images having different images.

20 Claims, 16 Drawing Sheets

METHOD OF DISPLAYING A THREE DIMENSIONAL IMAGE AND DISPLAY APPARATUS FOR PERFORMING THE METHOD

This application claims priority from and the benefit of Korean Patent Application No. 10-2012-0080539, filed on Jul. 24, 2012, which is hereby incorporated by reference for all purposes as if fully set forth herein.

BACKGROUND OF THE INVENTION

1. Field of the Invention

Exemplary embodiments of the present invention relate to a method of displaying a three-dimensional ("3D") image and a display apparatus for performing the method. More particularly, exemplary embodiments of the present invention relate to a method of displaying a 3D image for increasing a display quality of a 3D image and a display apparatus for performing the above-mentioned method.

2. Description of the Related Art

Generally, a liquid crystal display ("LCD") displays a two-dimensional ("2D") image. Recently, the LCD that displays the 3D image has been developed since demands for the 3D image has been increased in various industrial fields such as games, movies and so on.

Generally, the 3D image display apparatus displays the 3D image using binocular parallax between left and right eyes of human. For example, since two eyes of human are spaced apart from each other, images viewed at the different angles are inputted to the brain of human. Thus, the observer may watch the 3D image to recognize the stereoscopic image through the display apparatus.

The stereoscopic image display apparatus is classified into a stereoscopic type 3D display using glasses and an auto-stereoscopic type 3D display without using glasses. The stereoscopic type includes a passive polarized glasses type using a polarized filter glasses having a different polarized axis according to two eyes, and an active shutter glasses type using glasses which sequentially open and close a left-eye shutter and a right-eye shutter respectively synchronized with the image signal to be displayed.

The passive polarized glasses type uses the polarized filter selectively passing the 3D image for a left-eye frame image and a right-eye frame image, so that a luminance of the 3D image may be decreased. In addition, in the shutter glasses type, a liquid crystal ("LC") response time may be important to improve a crosstalk of the left-eye frame image and the right-eye frame. An improvement in the LC response time is limited. To solve this problem, a backlight unit is driven with a global blinking method so that the crosstalk of the left-eye frame image and the right-eye frame image may be improved. However, the global blinking method may decrease the luminance of the 3D image.

BRIEF SUMMARY OF THE INVENTION

Exemplary embodiments of the present invention provide a method of displaying an image capable of decreasing power consumption and improving display quality.

Exemplary embodiments of the present invention also provide a display apparatus for performing the method of displaying the image.

According to an exemplary embodiment of the invention, there is provided a method of displaying an image, the method includes sequentially displaying the three-dimensional image on a plurality of horizontal lines of a display panel along a scan direction, and simultaneously displaying a black image on the horizontal lines of the display panel, the black image being inserted between three-dimensional images having different images.

In an exemplary embodiment, the method may further include sequentially displaying a second three-dimensional image on a plurality of horizontal lines of a display panel along a reverse scan direction.

In an exemplary embodiment, wherein the first three-dimensional image may include a first left-eye frame image and the second three-dimensional image may include a first right-eye image.

In an exemplary embodiment, the method may further include a third three-dimensional image and a fourth three-dimensional image, and the third three-dimensional image may be a second right-eye frame image having the reverse scan direction, and the fourth three-dimensional image may be a second left-eye frame image having the forward scan direction In an exemplary embodiment, the first three-dimensional image may be a first right-eye frame image and the second three-dimensional image may be a first left-eye image.

In an exemplary embodiment, the method may further include sequentially displaying a second three-dimensional image on a plurality of horizontal lines of a display panel along a scan direction, and the first three-dimensional image may be a first left-eye frame image and the second three-dimensional image is a first right-eye image In an exemplary embodiment, the method may further include a third three-dimensional image and a fourth three-dimensional image, and the third three-dimensional image is a second left-eye frame image having the forward scan direction and a fourth three-dimensional image is a second right-eye frame image having the forward scan direction.

In an exemplary embodiment, the method may further include correcting a three-dimensional image data using a plurality of look-up tables corresponding to a plurality of space areas, the display panel being divided into a plurality of the space areas along the scan direction.

In an exemplary embodiment, the plurality of look-up tables may have a predetermined correction data, and the predetermined correction data of the space area near a starting point of scanning may have a lower gray scale than the predetermined correction data of the space area away from a starting point of scanning.

According to another exemplary embodiment of the invention, there is provided a display apparatus. The display apparatus includes a display panel including a plurality of gate lines and a plurality of data lines, a three-dimensional processing part generating three-dimensional image data including a left-eye data frame and a right-eye data frame, a panel driving part sequentially displaying a three-dimensional image on a plurality of horizontal lines of the display panel along a scan direction using the three-dimensional image data, and simultaneously displaying a black image on the horizontal lines of the display panel, the black image being inserted between three-dimensional images being different from each other.

In an exemplary embodiment, wherein the panel driving part may include a data driving part sequentially outputting a left-eye data signal of a left-eye data frame to the display panel by a horizontal period during a first period, outputting a black data signal to the display panel during a first sub period of a second period, sequentially outputting a right-eye data signal of a right-eye data frame to the display panel by a horizontal period during a third period and outputting a black data signal to the display panel during a second sub period of a fourth period, and a gate driving part sequentially outputting a gate one signal to the gate lines of the display panel during the first period, simultaneously outputting the gate on signal to the gate lines of the display panel during the first sub period of the second period, sequentially outputting the gate one signal to the gate lines of the display panel during the third period, and simultaneously outputting the gate on signal to the gate lines of the display panel during the second sub period of the fourth period.

In an exemplary embodiment, wherein the gate on signals simultaneously output to the gate lines during the first sub period and the second sub periods may have a pulse width being the same as each other.

In an exemplary embodiment, the display apparatus may further include a timing control part controlling the gate driving part in order that gate driving part outputs the gate on signal during the first and second sub periods.

In an exemplary embodiment, wherein the gate driving part may include an off line transferring a gate off voltage, a first voltage terminal connected to the off line and receiving the gate off voltage, a second voltage terminal receiving a gate on voltage, an output part outputting the gate on voltage into the gate on signal, and a holding part outputting the gate off voltage into a gate off signal.

In an exemplary embodiment, the display apparatus may further include a switching part connected to the off line, and selectively providing the off line with the gate on voltage and the gate off voltage, wherein the timing control part controls the switching part in order that the switching part provides the off line with the gate on signal during the first sub period and the second sub period.

In an exemplary embodiment, wherein the gate driving part may include a first voltage terminal receiving a gate off voltage, a second voltage terminal receiving a gate on voltage, an output part outputting the gate on voltage into the gate on signal, a holding part outputting the gate off voltage into a gate off signal, and a switching part connected between a node which is connected to the output part and the holding part and the second voltage terminal, and selectively outputs a voltage of the node and the gate on voltage based on a control of the timing control part.

In an exemplary embodiment, the display apparatus may further include a correcting part correcting a three-dimensional image data using a plurality of look-up tables corresponding to a plurality of space areas, and the display panel is divided into a plurality of the space areas along the scan direction.

In an exemplary embodiment, wherein the panel driving part may display at least one data frame of a plurality of three-dimensional data frames on the display panel along a different scan direction from each other.

In an exemplary embodiment, wherein the panel driving part may control the scan direction in order that a period in which a left-eye or a right-eye image is displayed on the display panel has an opposite shape to a period in which the left-eye image or the right-eye image adjacent to a following black image is displayed on the display panel.

In an exemplary embodiment, wherein the panel driving part may control the scan direction in order that the scan direction of the left-eye image or the right-eye image is opposite to the scan direction of the left-eye image or the right-eye image adjacent to a following black image.

According to the present invention, the black data signal corresponding to a refresh image is simultaneously applied to total horizontal lines in the display panel so that an inserting period in which the refresh image inserts between the three-dimensional images being different from each other may be decreased. Thus, a display quality of the three-dimensional image may be improved.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, embodiments of the present invention will be explained in detail with reference to the accompanying drawings.

Figure 1:
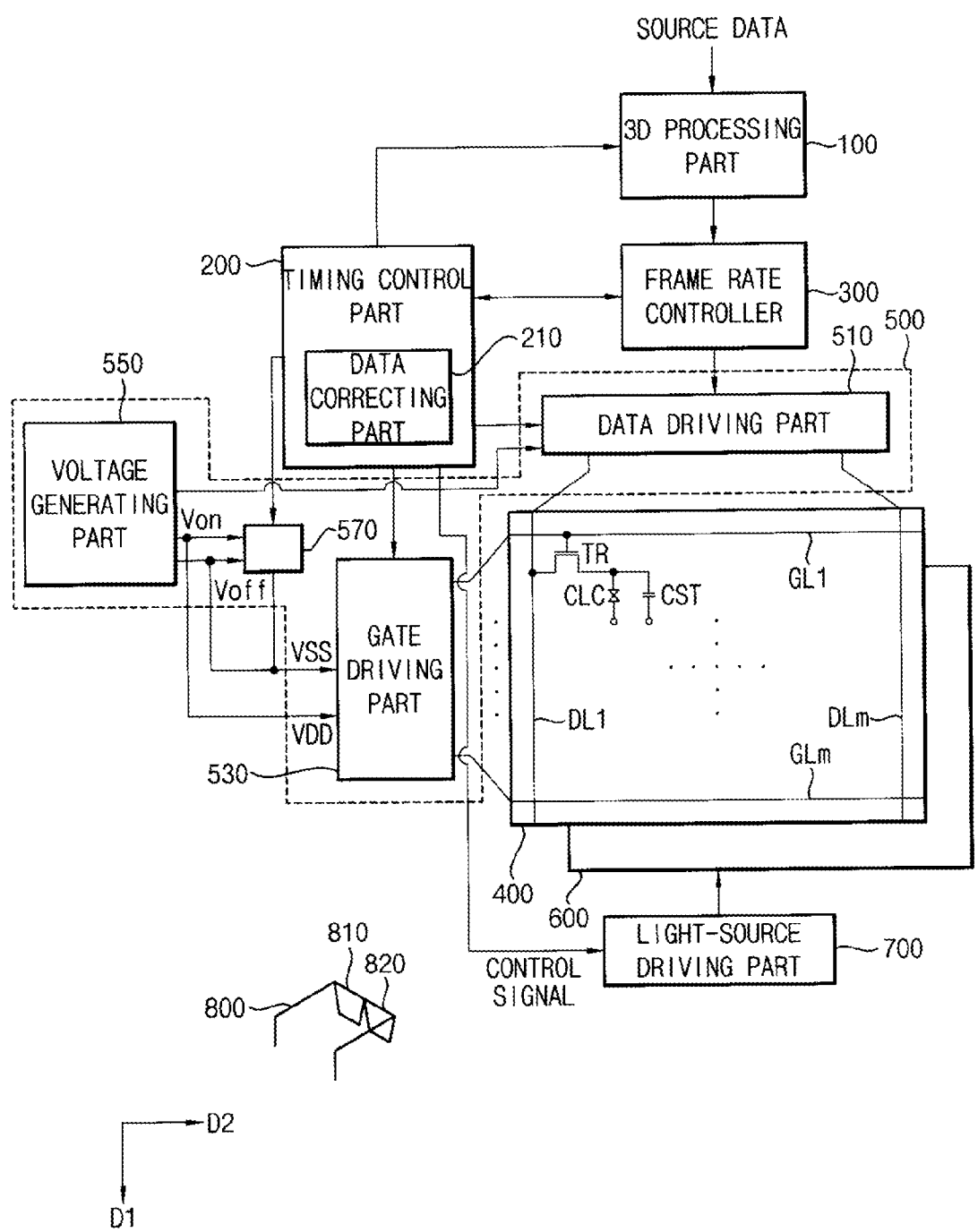
FIG. 1 is a block diagram illustrating an exemplary embodiment of a display apparatus according to the invention.

FIG. 1 is a block diagram illustrating an exemplary embodiment of a display apparatus according to the invention.

Referring to FIG. 1, the display apparatus includes a 3D processing part 100, a timing control part 200, a frame rate controller 300, a display panel 400, a panel driving part 500, a light-source part 600, a light-source driving part 700 and a glasses part 800.

The 3D processing part 100 process the received source data by a frame period into 3D image data format in a 3D image mode. The 3D processing part 100 divides the source data frame into a left-eye data and a right-eye data, and respectively scales the left-eye data and the right-eye data into left-eye data frame and right-eye data frame corresponding to a resolution of the display panel 400. The 3D processing part 100 sequentially outputs 3D image data which includes the left-eye data frame and the right-eye data frame.

The timing control part 200 generates a timing control signal to drive the display apparatus, and controls the 3D processing part 100, the frame rate controller 300, the panel driving part 500, the light source driving part 700 and the glasses part 800.

The timing control part 200 includes a data correcting part 210. The data correcting part 210 corrects the 3D image data using a plurality of look-up tables ("LUTs") having predetermined correction data corresponding to a plurality of space areas which is included in the display panel 400.

For example, the data correcting part 210 corrects the left-eye data frame or the right-eye data frame presently received based on the right-eye data frame or the left-eye data frame previously received. According to the present exemplary embodiment, the data correcting part 210 includes the LUTs storing correction data respectively corresponding to the space areas. A method of correcting the data of the data correcting part 210 will be explained referring to FIG. 4.

The frame rate controller 300 controls a frame rate of the 3D image data received from the timing control part 200 by the frame period.

For example, when a frame frequency of the display panel 400 is 240 Hz and the frame frequency of the data received from the timing controller part 200 is 120 Hz, the frame rate controller 300 respectively repeats the left-eye data frame and the right-eye data frame. When the frame frequency of the display panel 400 is 360 Hz and the frame frequency of the data received from the timing controller part 200 is 120 Hz, the frame rate controller 300 respectively repeats the left-eye data frame and the right-eye data frame three times. The frame rate controller 300 may sequentially outputs multiple left-eye data frames and right-eye data frames.

The display panel 400 includes first to n-th data lines DL1, ..., DLn, first to m-th gate lines GL1, ..., GLm, and a plurality of pixels P. The first to n-th data lines DL1, ..., DLn are extended along a column direction and arranged along a row direction. The first to m-th gate lines GL1, ..., GLm are extended along the row direction and arranged along the column direction. Each pixel P may include a switching element TR connected to a gate line GL1 and a data line DL1, a liquid crystal capacitor CLC connected to the switching element TR and a storage capacitor CST.

The panel driving part 500 sequentially displays at least one left-eye frame image, at least one refresh frame image, at least one right-eye frame image and at least one refresh frame image on the display panel 400, using the data frames received from the frame rate controller 300. The panel driving part 500 includes a data driving part 510, a gate driving part 530, a voltage generating part 550 and a switching part 570. Hereinafter, the refresh frame image may be referred to as a black frame image.

The data driving part 510 outputs a data voltage of the left-eye data frame to the display panel 400 during a first period, outputs a black data voltage of the black image to the display panel 400 during a second period, outputs a data voltage of the right-eye data frame to the display panel 400 during a third period, outputs a black data voltage of the black image to the display panel 400 during a fourth period according to a control signal of the timing control part 200. The first, second, third and fourth periods are substantially the same as each other and each of the first, second, third and fourth periods has a first time T1, T2, T3 and T4 respectively. The first, second, third and fourth periods may have a first time T.

The gate driving part 530 sequentially outputs gate on signals to first to m-th gate lines GL1, ..., GLm during the first period and simultaneously outputs the gate on signals to the first to m-th gate lines GL1, ..., GLm during a first sub period of the second period according to the control of the timing control part 200.

In addition, the gate driving part 530 sequentially outputs the gate on signals to first to m-th gate lines GL1, ..., GLm during the third period and simultaneously outputs the gate on signals to the first to m-th gate lines GL1, ..., GLm during a second sub period of the fourth period according to the control of the timing control part 200. The gate driving part 530 outputs a gate off signal to the first to m-th gate lines GL1, ..., GLm during a remainder period except for the first sub period of the second period. In addition, the gate driving part 530 outputs the gate off signal to the first to m-th gate lines GL1, ..., GLm during a remainder period except for the second sub period of the fourth period.

The gate on signals which are simultaneously applied to the first to m-th gate lines GL1, ..., GLm during the first and the second sub periods, are substantially the same width and outputted at the same timing. Therefore, the widths of the gate on signals may overlap with each other. Each of the first and the second sub periods has a second time t shorter than the first time T.

The voltage generating part 550 generates a driving voltage to drive the display panel 400. For example, the driving voltage may include a digital power supply voltage, an analog power supply voltage, a gate on voltage Von and a gate off voltage Voff. The digital power supply voltage and the analog power supply voltage are applied to the data driving part 510. The gate on voltage Von and the gate off voltage Voff are applied to the gate driving part 530 and the switching part 570.

The switching part 570 selectively provides the first voltage terminal TML1 of the gate driving part 530 with the gate off voltage Voff and the gate on voltage Von according to the control signal of the timing control part 200. For example, the switching part 570 provides the first voltage terminal TML1 with the gate off voltage Voff during the remainder period except for the first and the second sub periods of a driving period in which the gate driving part 530 is driven. The switching part 570 provides the first voltage terminal TML1 with the gate on voltage Von during the first and second sub periods.

Therefore, the gate on signals which have the same width may be simultaneously applied to the first to the m-th gate lines GL1, ..., GLm during the first and second sub periods.

The light source part 600 provides a light to the display panel 400. The light source part 600 is arranged in such as a direct-illumination type or an edge-illumination type. The light source part 600 of the edge-illumination type includes a light guide plate ("LGP") disposed under the display panel 400 and at least one light source disposed at an edge portion of the LGP. The light source part 600 of the direct-illumination type includes at least one light source disposed directly under the display panel 400, and may omits the LGP.

The light source driving part 700 drives the light source part 600 according to the control signal of the timing part 200.

The light source driving part 700 drives the light source part 600 by a global blinking mode. For example, the light source part 600 provides the light to the display panel 400 during a period when the left-eye frame image or the right-eye frame image corresponding to the left-eye data frame or the right-eye data frame is displayed on the display panel 400, and blocks the light from the display panel 400 during a period when the black frame image corresponding to the black data voltage is displayed on the display panel 400. Alternatively, the light-source driving part 700 drives the light source part 600 by a scanning mode. According to the scanning mode, the light-source driving part 700 sequentially drives a plurality of light-emitting blocks, which is divided along the scan direction, based on the image displayed on the display panel 400.

The glasses part 800 includes a left-eye part 810 and a right-eye part 820. The glasses part 800 may use an active shutter glasses mode or a passive polarization glasses mode. The left-eye part 810 transmits the left-eye frame image and blocks the right-eye frame image. The right-eye part 820 transmits the right-eye frame image and blocks the left-eye frame image.

When the glasses part 800 uses the passive polarization glasses mode, the display apparatus may further include a polarization panel disposed on the display panel 400. The polarization panel changes the frame image displayed on the display panel 400 into polarized lights different from each other. Thus, the left-eye part 810 and the right-eye part 820 of the glasses part 800 may selectively transmit the polarized left-eye frame image and the right-eye frame image.

Figure 2:
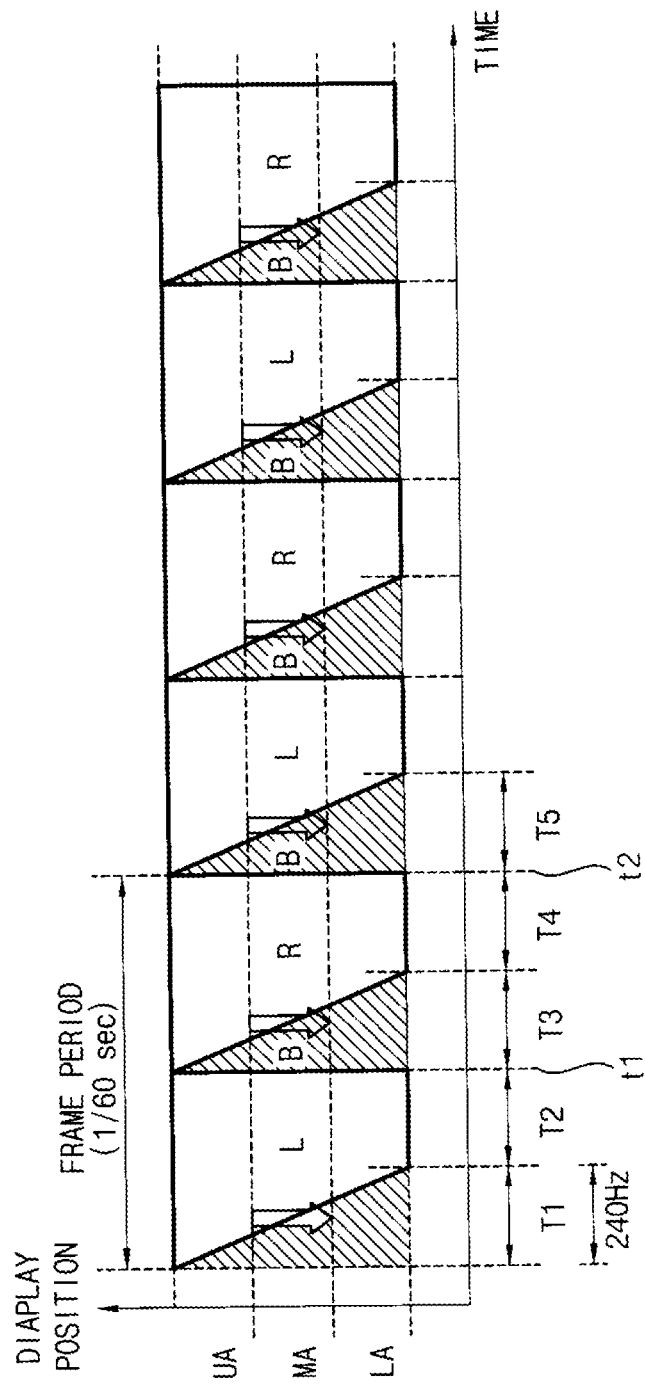
FIG. 2 is a conceptual diagram illustrating an exemplary embodiment of a method of displaying a three-dimensional ("3D") image according to the display apparatus of FIG. 1.
Figure 3:
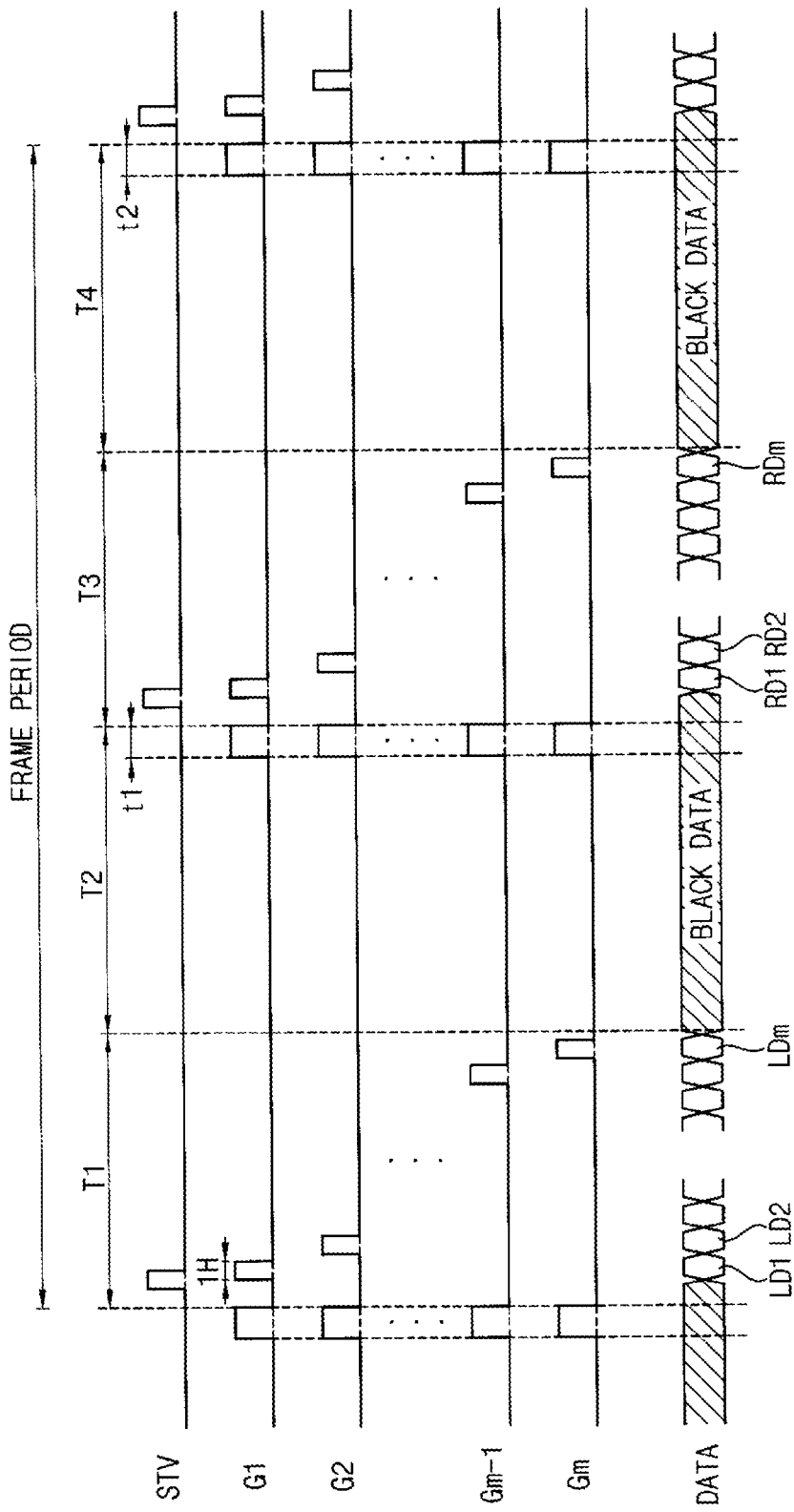
FIG. 3 is a waveform diagram illustrating an exemplary embodiment of a method of driving a display panel of FIG. 1.

FIG. 2 is a conceptual diagram illustrating an exemplary embodiment of a method of displaying a three-dimensional ("3D") image according to the display apparatus of FIG. 1. FIG. 3 is a waveform diagram illustrating an exemplary embodiment of a method of driving a display panel of FIG. 1.

Referring to FIGS. 1, 2 and 3, the 3D processing part 100 outputs the 3D image data which includes a left-eye data frame and a right-eye data frame. The frame rate controller 300 sequentially outputs two left-eye data frames and two right-eye data frames corresponding to a frame frequency of 240 Hz. In the present exemplary embodiment, a frame period may be referred to as 1/60 sec. and each period may be referred to as ¼ frame period.

The data driving part 510 sequentially outputs a data signal of the left-eye data frame by a horizontal period (1H) during the first period T1. The data frame includes first to m-th line data signals LD1, LD2, . . . , LDm of the first to the m-th horizontal lines corresponding to first to m-th gate lines. The first to the m-th line data signals LD1, LD2, . . . , LDm are sequentially applied to the display panel 400 by the horizontal period unit during the first period T1.

The gate driving part 530 sequentially outputs first to m-th gate on signals G1, G2, . . . , Gm to the first to the m-th gate lines in synchronization with the first to the m-th line data signals LD1, LD2, . . . , LDm of the left-eye data frame outputted from the data driving part 510 during the first period T1.

Here, a first gate line GL1 is disposed on an upper area of the display panel 400 and a last gate line that is an m-th gate line GLm is disposed on a lower area of the display panel 400. The gate on signal and the line data signal are sequentially applied to the display panel 400 along a forward direction which is proceed from the upper area to the lower area of the display panel 400.

Therefore, during the first period T1, the display panel 400 sequentially displays the left-eye data frame corresponding to a left-eye image L by the horizontal line unit along the forward direction.

The data driving part 510 outputs a black data signal corresponding to a refresh image to the display panel 400 during a second period T2 next to the first period T1.

The gate driving part 530 outputs the gate off signal Voff to the first to the m-th gate lines during the second period T2 except the first sub period t1 which is positioned at a latter part of the second period T2. The gate driving part 530 simultaneously outputs the first to the m-th gate on signals G1, G2, . . . , Gm which have the same width to the first to the m-th gate lines GL1, . . . , GLm during the first sub period t1.

Therefore, during the second period T2 except the first sub period t1, the display panel 400 holds the left-eye image L which is displayed on display panel 400 during the first period T1. During the first sub period t1, the display panel 400 simultaneously displays the black image B corresponding to the black data signal on the horizontal lines of the display panel 400.

The data driving part 510 sequentially outputs the right-eye data frame to the display panel 400 by the horizontal period (1H) during a third period next to the second period T2. During the third period T3, first to m-th line data signals RD1, RD2, . . . , RDm of the right-eye data frame are sequentially applied to the display panel 400 by the horizontal period.

The gate driving part 530 sequentially outputs first to m-th gate on signals G1, G2, . . . , Gm to the first to the m-th gate lines in synchronization with the first to the m-th line data signals RD1, RD2, . . . , RDm of the right-eye data frame outputted from the data driving part 510 during the third period T3.

Therefore, during the third period T3, the display panel 400 sequentially displays the right-eye data frame corresponding to a right-eye image R by the horizontal line unit along the forward direction.

The data driving part 510 outputs the black data signal corresponding to the refresh image to the display panel 400 during a fourth period T4 next to the third period T3.

The gate driving part 530 outputs the gate off signal Voff to the first to m-th gate lines during the fourth period T4 except the second sub period t2 which is positioned at a latter part of the fourth period T4. The gate driving part 530 simultaneously outputs the first to m-th gate on signals G1, G2, . . . , Gm which have the same width to the first to m-th gate lines GL1, . . . , GLm during the second sub period t2.

Therefore, during the fourth period T4 except the second sub period t2, the display panel 400 holds the right-eye image R which is displayed on display panel 400 during the third period T3. During the second sub period t2, the display panel 400 simultaneously displays the black image B corresponding to the black data signal on the horizontal lines of the display panel 400.

As shown in FIG. 2, the left-eye or the right-eye image L or R has the forward scan direction, so that a 3D displaying period (or "3D charging period") in which the data signal of the left-eye or the right-eye image L or R is displayed in the display panel 400 has a shape such as an inverted-trapezoid shape which has an upper side being longer than a lower side. A length of the upper side is a first 3D displaying period in which a first horizontal line data signal is charged in a first horizontal line of the display panel 400. A length of the lower side is a last 3D displaying period in which a last horizontal line data signal is charged in a last horizontal line of the display panel 400. A black displaying period (or "black charging period") in which the black data signal of the black image B is charged in the display panel 400 may have a shape such as a right triangle shape.

For example, the first horizontal line of the left-eye image has the first 3D displaying period of about 8.2 ms corresponding to a sum of the first and the second periods T1 and T2, and the m-th horizontal line of the left-eye image has the last 3D displaying period of about 4.1 ms corresponding to the second period T2.

However, the first horizontal line of the black image has a first black displaying period corresponding to the first sub period t1 and the m-th horizontal line of the black image has a last black displaying period of about 4.1 ms corresponding to the third period T3.

The first horizontal line of the right-eye image has the first 3D displaying period of about 8.2 ms corresponding to a sum of the first and the second periods T3 and T4, and the m-th horizontal line of the right-eye image has the last 3D displaying period of about 4.1 ms corresponding to the second period T4.

However, the first horizontal line of the black image has the first black displaying period corresponding to the second sub period t2 and the m-th horizontal line of the black image has the last black displaying period of about 4.1 ms corresponding to the fifth period T5.

Each of the first, the second, the third and the fourth periods corresponds to the frame period 1F, and each of the first and the second sub periods t1 and t2 is equal to or longer than the horizontal period (1H) and equal to or shorter than the frame period (1F).

As described above, a luminance of the black image B is gradually increased along a direction from the upper area to lower area of the display panel 400. However, a luminance of the 3D image L or R is gradually decreased along the direction from the upper area to lower area of the display panel 400.

In order to improve a luminance difference described above, in the present exemplary embodiment, different correcting data may be applied to a plurality of space areas of the display panel 400 arranged in the scan direction so that the luminance difference according to the space areas may be corrected.

Figure 4:
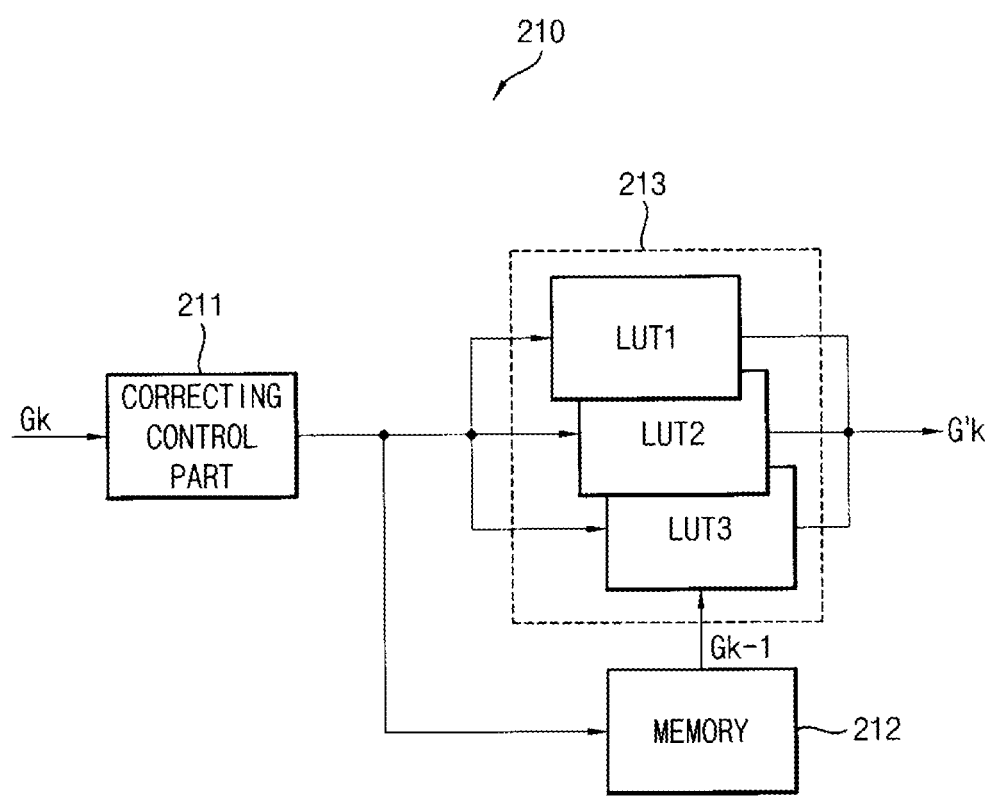
FIG. 4 is a block diagram illustrating an exemplary embodiment of a data correcting part of FIG. 1.

FIG. 4 is a block diagram illustrating an exemplary embodiment of a data correcting part of FIG. 1.

Referring to FIGS. 1, 3 and 4, the data correcting part 210 includes a correcting control part 211, a memory 212 and a correcting part 213.

The correcting control part 211 determines the space area of the display panel 400 included in the pixel corresponding to the image data Gk received presently. The correction control part 211 controls the correcting part 213 based on the determined space area of the image data Gk.

The memory 212 stores the present image data Gk received presently under a control of the correction control part 211. The previous image data Gk-1 received previously corresponding to the present image data Gk are readout from the memory 212 and are provided to the correcting part 213 under a control of the correction control part 211.

The correcting part 213 stores correction data for correcting black-grayscale differences of the image data respectively corresponding to the space areas. The display panel 400 may be divided into the space areas along the scanning direction.

For example, the correcting part 213 includes a first LUT LUT1 storing first correction data corresponding to the upper area UA, a second LUT LUT2 storing second correction data corresponding to the middle area MA, and a third LUT LUT3 storing third correction data corresponding to the lower area LA. The divided space areas are not limited to the upper, middle and lower areas, and may be variously preset.

The black frame image inserted between the left-eye frame image and the right-eye frame image is the gradual black frame image including black grayscales which are gradually increased from the upper area UA toward the lower area LA.

For example, a black image displayed on the upper area UA may be assumed to be a 30-grayscale, a black image displayed on the middle area MA may be assumed to be a 20-grayscale and a black image displayed on the lower area LA may be assumed to be a 10-grayscale. The first LUT LUT1 stores the correction data corresponding to the present image data based on the black image data of the 30-grayscale inserted between the previous image data received previously and the present image data received presently. The second LUT LUT2 stores the correction data corresponding to the present image data based on the black image data of the 20-grayscale inserted between the previous image data received previously and the present image data received presently. The third LUT LUT3 stores the correction data corresponding to the present image data based on the black image data of the 10-grayscale inserted between the previous image data received previously and the present image data received presently.

For example, when the present image data Gk are image data of a 200-grayscale and the previous image data Gk-1 are image data of the 200-grayscale, the present image data may be corrected into the correction data G'k of a 210-grayscale based on the inserted black image data of the 30-grayscale in the upper area UA, the present image data may be corrected into the correction data G'k of a 220-grayscale based on the inserted black image data of the 20-grayscale less than the 30-grayscale in the middle area MA and the present image data may be corrected into the correction data G'k of a 230-grayscale based on the inserted black image data of the 10-grayscale less than the 20-grayscale in the lower area LA. The image data of the lower area LA displaying the black image of a lower grayscale may be overdriven with respect to the image data of the upper area UA displaying the black image of a higher grayscale.

As described above, the data correcting part 210 may correct the luminance difference between the upper area UA and lower area LA due to the inserted gradual black image.

Figure 5:
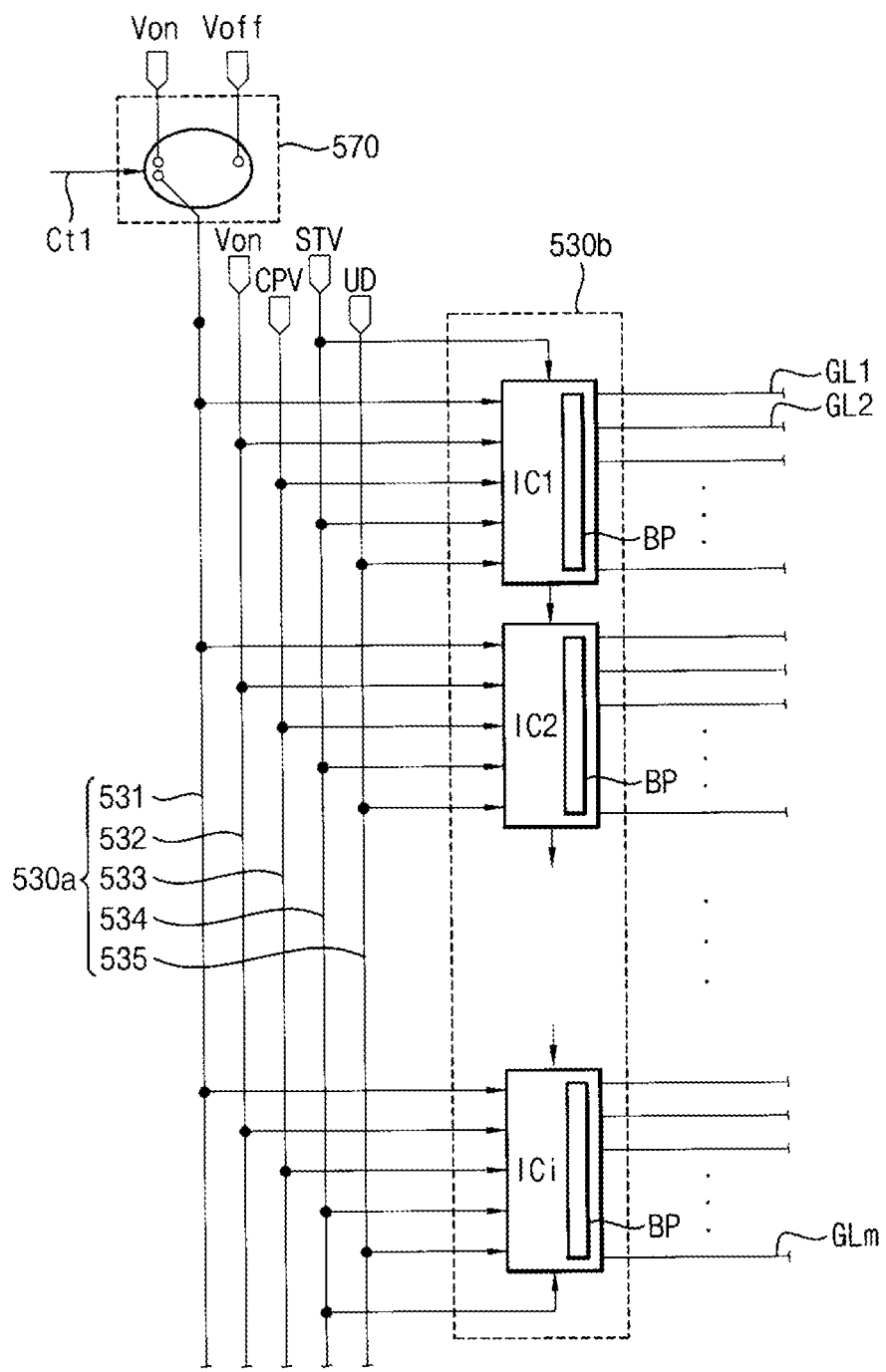
FIG. 5 is a block diagram illustrating an exemplary embodiment of a gate driving part of FIG. 1.

FIG. 5 is a block diagram illustrating an exemplary embodiment of a gate driving part of FIG. 1.

Referring to FIGS. 1, 3 and 5, the gate driving part 530 includes a line part 530a and a circuit part 530b.

The line part 530a includes an off line 531 receiving the gate off voltage Voff, an on line 532 receiving the gate on voltage Von, a clock line 533 receiving a gate clock signal CPV, a starting line 534 receiving a start vertical signal STV and a control line 535 receiving a scan control signal UD which controls the scan direction into the forward direction or the reverse direction.

The circuit part 530b includes a plurality driving circuits IC1, IC2, ..., ICi. Each driving circuit generates a plurality gate signals based on the driving signal transferred from the line part 530a, and outputs the gate signals to a plurality gate lines. For example, the driving circuit includes a first voltage terminal receiving the gate off voltage Voff, a second voltage terminal receiving the gate on voltage Von, and an output terminal connected to a gate line.

The switching part 570 receives the gate on voltage Von and the gate off voltage Voff from the voltage generating part 550, and selectively provides the off line 531 with the gate on voltage Von and the gate off voltage Voff based on the control signal Ctl received from the timing control part 200.

For example, the switching part 570 outputs the gate on voltage Von to the off line 531 during the first and the second sub periods t1 and t2 during which the gate on signal is simultaneously applied to the first to the m-th gate lines GL1, GL2, . . . , GLm. However, the switching part 570 provides the off line 531 with the gate off voltage Voff during the remainder period except for the first and the second sub periods t1 and t2 of the driving period in which the gate driving part 530 is driven.

As described above, the gate driving part 530 may include a plurality of driving circuits but not limited thereto. The gate driving part 530 is disposed in a peripheral area of the display panel 400 and includes a plurality of thin film transistors (TFTs) which may be formed via the process substantially same as that forming a thin film transistor for a pixel in display area of the display panel 400.

Figure 6A:
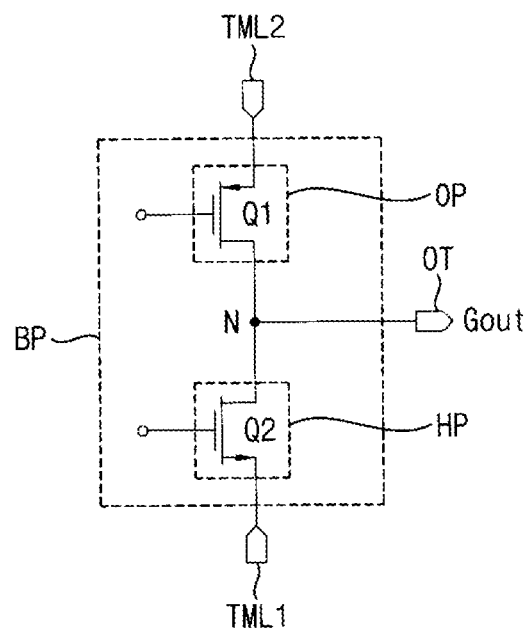
FIGS. 6A and 6B are conceptual diagrams illustrating an exemplary embodiment of an output buffer part of in FIG. 5.
Figure 6B:
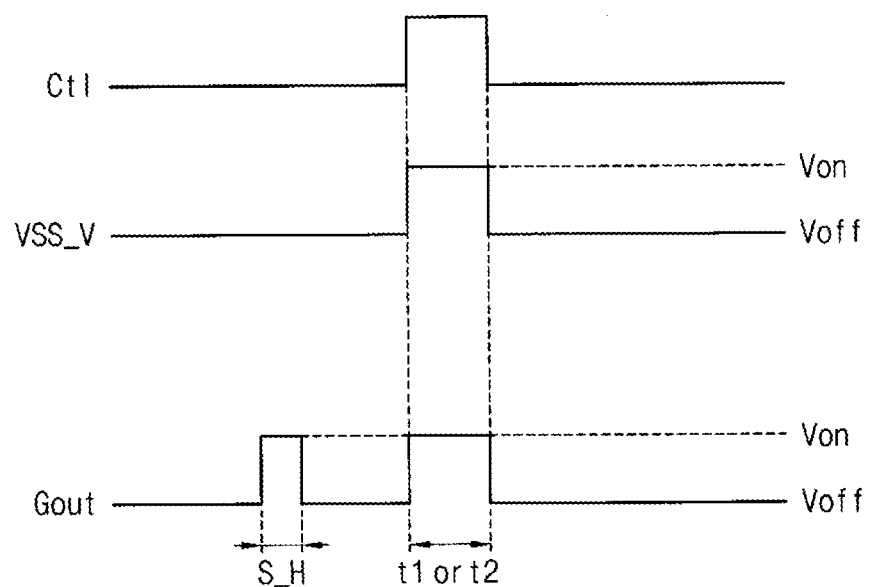

FIGS. 6A and 6B are conceptual diagrams illustrating an exemplary embodiment of an output buffer part in the circuit part 530b.

Referring to FIGS. 5, 6A and 6B, the output buffer part includes an output part OP and a holding part HP.

The output part OP includes at least one first transistor Q1. The first transistor Q1 is turned on during a preset horizontal period S_H and applies the gate on voltage Von received from the second voltage terminal TML2 to the gate line connected to the output terminal OT (Gout).

The holding part HP includes at least one second transistor Q2. The second transistor Q2 holds a voltage of the output terminal OT to the gate off voltage Voff received from the first voltage terminal TML1 during the remainder period except for the horizontal period S_H of the frame period. The output terminal OT is connected to a node N which is connected to an output node of the first transistor Q1 and an input node of the second transistor Q2.

In the present exemplary embodiment, the timing control part 200 provides the switching part 570 with the control signal Ctl during the first and the second sub periods t1 and t2 in which the black data signal is simultaneously applied to the display panel 400. In response to the control signal Ctl, the switching part 570 provides the off line 531 connected to the first voltage terminal TML1 of the driving circuit with the gate on voltage Von. Thus, the first voltage terminal TML1 receives the gate on voltage Von during the first and the second sub periods t1 and t2 (VSS_V).

Therefore, the second transistor Q2 provides the gate line connected to the output terminal OT with the gate on voltage Von received from the first voltage terminal TML1.

As a result, the driving circuit may output the gate on signal to the gate line during the first and the second sub periods t1 and t2.

Figure 7:
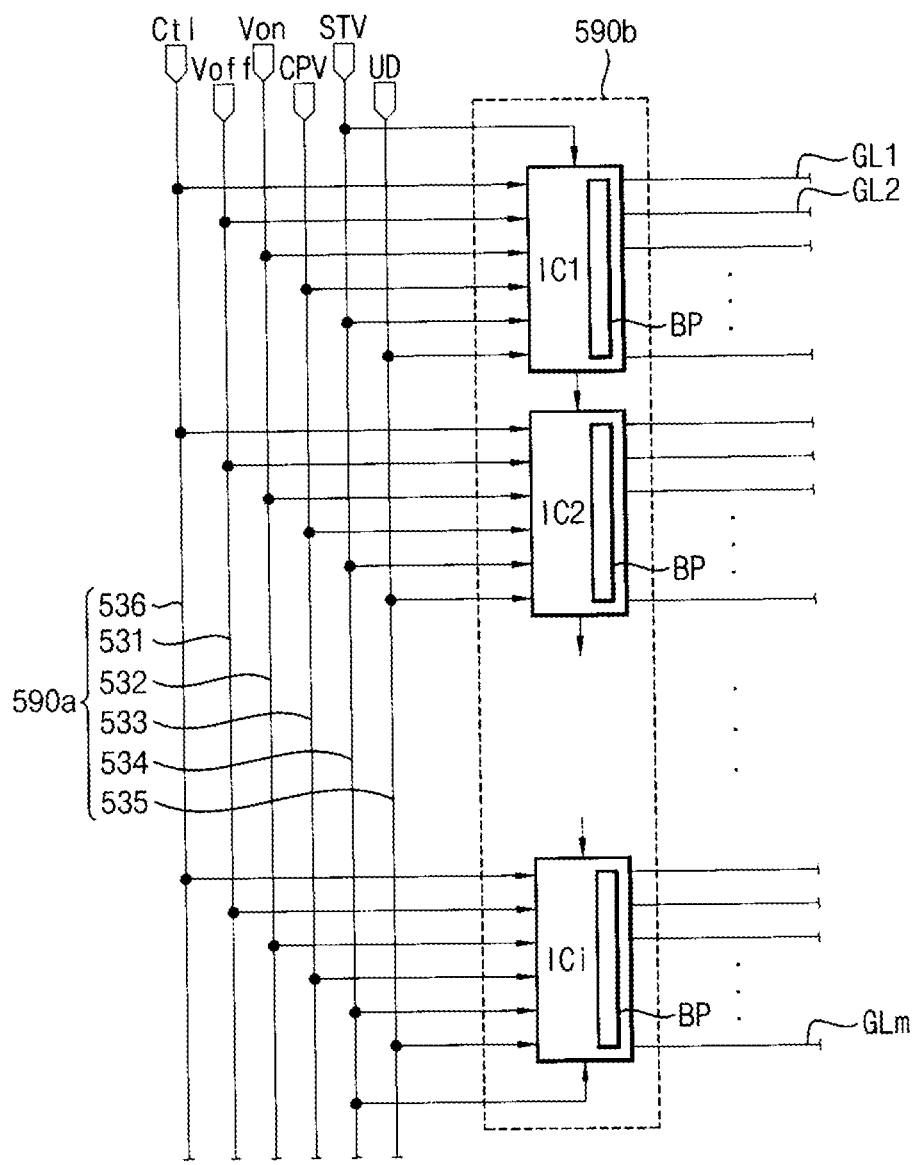
FIG. 7 is a block diagram illustrating an alternative exemplary embodiment of a gate driving part according to the invention.
Figure 8:
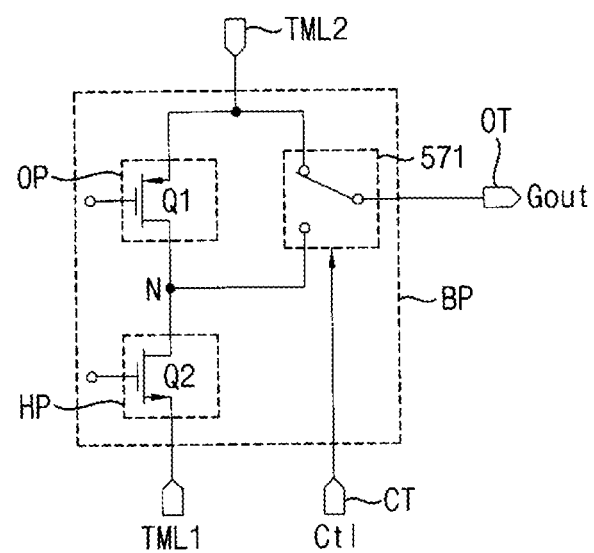
FIG. 8 is a conceptual diagrams illustrating an exemplary embodiment of an output buffer part in FIG. 7.

FIG. 7 is a block diagram illustrating an alternative exemplary embodiment of a gate driving part according to the invention. FIG. 8 is a conceptual diagram illustrating an exemplary embodiment of an output buffer part in FIG. 7.

Hereinafter, the same reference numerals are used to refer to the same or like parts as those described in the previous exemplary embodiments, and the same detailed explanations are not repeated unless necessary or are simplified.

Referring to FIGS. 7 and 8, the gate driving part 590 includes a line part 590a and a circuit part 590b.

The line part 590a further includes a control line 536 which transfers a control signal Ctl received from the timing control part in comparison with the pervious exemplary embodiment in FIG. 5.

The circuit part 590b includes a plurality driving circuits IC1, IC2, . . . , ICi. Each driving circuit includes a control terminal CT receiving the control signal Ctl and a switching part 571 selectively providing the output terminal OT with the gate on voltage.

Each driving circuit includes an output buffer part BP. The output buffer part BP according to the present exemplary embodiment further includes the switching part 571 in comparison with the pervious exemplary embodiment in FIG. 6A.

The output buffer part BP includes an output part OP, a holding part HP and a switching part 571. The output part OP includes at least one first transistor Q1. The first transistor Q1 is turned on during a preset horizontal period S_H and applies the gate on voltage Von received from the second voltage terminal TML2 to the switching part 571.

The holding part HP includes at least one second transistor Q2. The second transistor Q2 applies the gate off voltage Voff received from the first voltage terminal TML1 to the switching part 571 during the remainder period except for the horizontal period S_H of the frame period.

The switching part 571 selectively switches between the second voltage terminal TML2 and the node N based on the control signal Ctl. Thus, the switching part 571 selectively provides the output terminal OT with the gate on voltage Von received from the second voltage terminal TML2 and a voltage Von or Voff of the node N which is connected to the output electrode of the first transistor Q1 and the input electrode of the second transistor Q2.

For example, the timing control part 200 provides the switching part 571 with the control signal Ctl during the first and the second sub periods t1 and t2 in which the black data signal is simultaneously applied to the display panel 400.

The switching part 571 provides the output terminal OT with the gate on voltage Von received from the second voltage terminal TML2 during the first and the second sub periods t1 and t2 based on the control signal Ctl (CT).

The switching part 571 provides the output terminal OT with the voltage of the node N during the remainder period except for the first and the second sub periods t1 and t2 of the driving period in which the gate driving part 590 is driven based on the control signal Ctl (CT).

As a result, the driving circuit may output the gate on signal to the gate line during the first and the second sub periods t1 and t2.

Hereinafter, a method of controlling the scan direction of the 3D image will be explained by describing in detailed exemplary embodiments to improve the luminance difference of the 3D image by the black image inserted between the 3D images different from each other. When the scan direction of the 3D image is controlled to improve the luminance difference of the 3D image, the data correcting part may be used to improve a response time of an image data of a present frame based on an image data of a previous frame.

Figure 9:
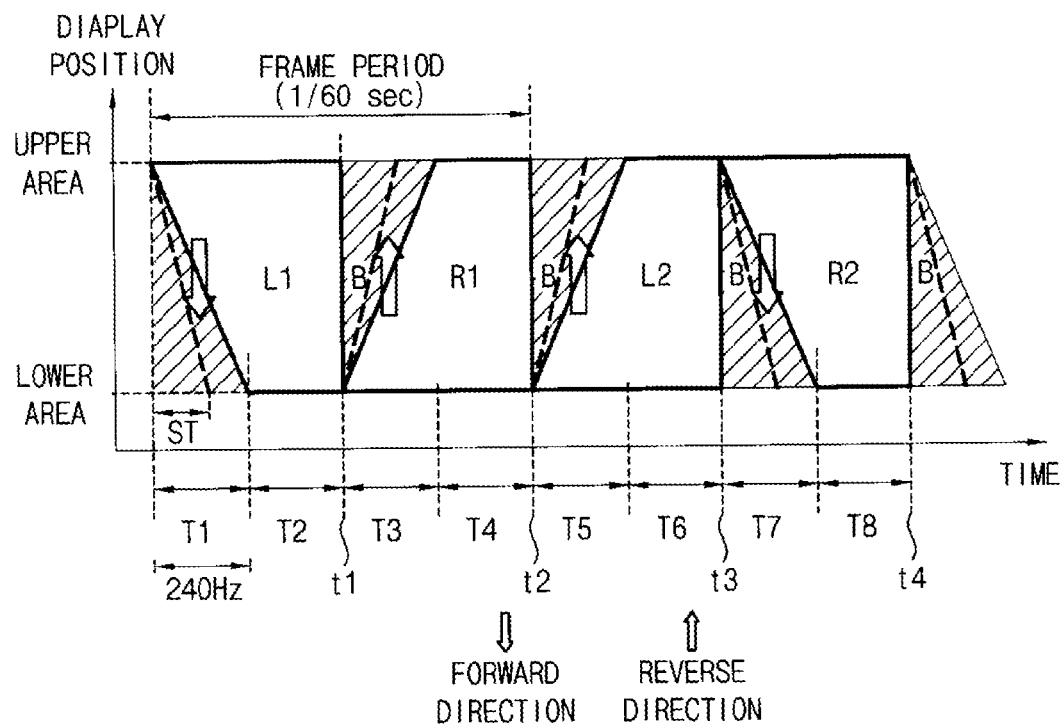
FIG. 9 is a conceptual diagram illustrating an alternative exemplary embodiment of a method of displaying a 3D image according to the invention.

FIG. 9 is a conceptual diagram illustrating an alternative exemplary embodiment of a method of displaying a 3D image according to the invention.

Referring to FIG. 9, the scan direction of the 3D image according the present exemplary embodiment includes a forward direction which proceeds from an upper area to a lower area of the display panel and a reverse direction which proceeds from the lower area to the upper area of the display panel. When the scan direction is the reverse direction, the gate driving part sequentially provides m-th to first gate lines with the gate on signal, and the data driving part sequentially provides the display panel with m-th to first line data signals of the data frame in synchronization with the gate driving part.

Hereinafter, a method of displaying the 3D image on display panel with the frame frequency of 240 Hz using the panel driving part of the present exemplary embodiment will be explained.

For example, during a first period T1, the display panel sequentially displays a first left-eye image L1 by the horizontal line unit along a forward scan direction. The display panel holds the first left-eye image L1 during a second period T2 next to the first period T1 except a first sub period t1 in the second period T2. The display panel simultaneously displays the black image B on every horizontal line during the first sub period t1. During a third period T3 next to the second period T2, the display panel 400 sequentially displays a first right-eye image R1 by the horizontal line unit along a reverse scan direction. The display panel holds the first right-eye image R1 during a fourth period T4 next to the third period T3 except a second sub period t2 in the fourth period T4. The display panel simultaneously displays the black image B on every horizontal line during the second sub period t2.

During the fifth period T5 next to the fourth period T4, the display panel sequentially displays a second left-eye image L2 by the horizontal line unit along the reverse scan direction. The display panel holds the second left-eye image L2 during a sixth period T6 next to the fifth period T5 except a third sub period t3 in the sixth period T6. The display panel simultaneously displays the black image B on every horizontal line during the third sub period t3. During a seventh period T7 next to the sixth period T6, the display panel 400 sequentially displays a second right-eye image R2 by the horizontal line unit along the forward scan direction. The display panel holds the second right-eye image R2 during an eighth period T8 next to the seventh period T7 except a fourth sub period t4 in the eighth period T8. The display panel simultaneously displays the black image B on every horizontal line during the fourth sub period t4.

As described above, according to the method of displaying the 3D image of the present exemplary embodiment, the scan direction is repeated by every 4 periods.

As shown in FIG. 9, the first left-eye image L1 and the second right-eye image R2 are sequentially displayed on the display panel along the forward scan direction. The 3D displaying period, in which the data signal of the first left-eye image L1 or the second right-eye image R2 is charged in the display panel, may be an inverted-trapezoid shape having an upper side being longer than a lower side. In addition, the first right-eye image R1 and the second left-eye image L2 are sequentially displayed on the display panel along the reverse scan direction. The 3D displaying period, in which the data signal of the first right-eye image R1 or the second left-eye image L2 is charged in the display panel, may be a trapezoid shape having the lower side being longer than the upper side. However, the black image B inserted between the 3D images having the forward scan direction may have a first black displaying period, in which the black data signal is charged in the display panel, such as a right triangle shape. In addition, the black image B inserted between the 3D images having the reverse scan direction may have a second black displaying period, in which the black data signal is charged in the display panel, such as an inverted right triangle shape.

According to the present exemplary embodiment, the 3D displaying period of the first left-eye image L1 has an opposite shape to the 3D displaying period of the second left-eye image L2 adjacent to a following black image B. In addition, the 3D displaying period of the first right-eye image R1 has an opposite shape to the 3D displaying period of the second right-eye image R2 adjacent to a following black image B.

According to the present exemplary embodiment, the scan direction of the first left-eye image L1 is opposite to the scan direction of the second left-eye image L2 adjacent to the following black image B. Thus, the first left-eye image L1 has an upper area of the display panel being brighter than a lower area of the display panel and the second left-eye image L2 has the lower area of the display panel being brighter than the upper area of the display panel. A left image includes the first left-eye image L1 and the second left-eye image L2, as a result, the left image may have a uniform luminance with respect to the whole display panel.

In addition, the scan direction of the first right-eye image R1 is opposite to the scan direction of the second right-eye image R2 adjacent to the following black image B. Thus, the first right-eye image R1 has the lower area of the display panel being brighter than the upper area of the display panel. The second right-eye image R2 has the upper area of the display panel being brighter than the lower area of the display panel. A right image includes the first right-eye image R1 and the second right-eye image R2, as a result, the right image may have a uniform luminance with respect to the whole display panel.

As described above, a scan period in which the left-eye or the right-eye image is scanned on the display panel is substantially the same as each period (e.g., T1), but not limited thereto. As dotted lines shown in FIG. 9, the scan period ST may be shorter than each period (e.g. T1). When the scan period ST is shorter than each period, the 3D displaying period of the left-eye or the right-eye image may be increased so that a display quality of the 3D image may be improved.

Figure 10:
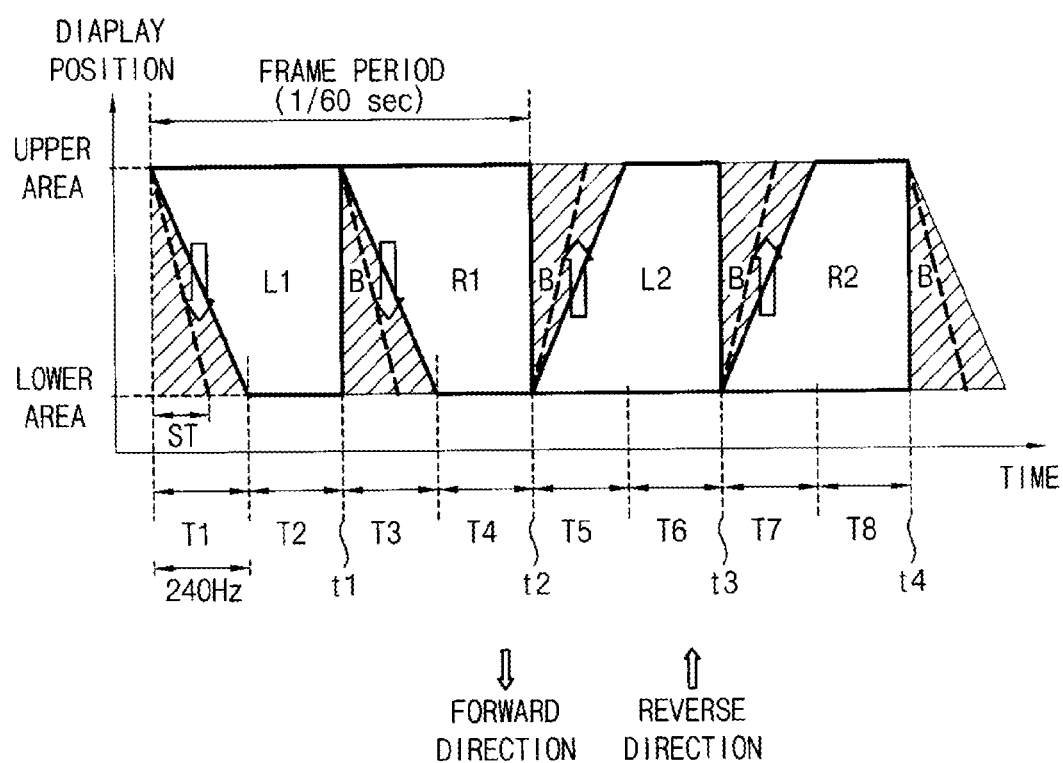
FIG. 10 is a conceptual diagram illustrating another alternative exemplary embodiment of a method of displaying a 3D image according to the invention.

FIG. 10 is a conceptual diagram illustrating another alternative exemplary embodiment of a method of displaying a 3D image according to the invention.

Referring to FIG. 10, the method of displaying a 3D image on the display panel with the frame frequency of 240 Hz by the panel driving part will be explained. In the present exemplary embodiment, a frame period may be referred to as 1/60 sec. and each period may be referred to as 1/4 frame period.

During a first period T1, the display panel 400 sequentially displays a first left-eye image L1 by the horizontal line unit along the forward scan direction. The display panel holds the first left-eye image L1 during a second period T2 next to the first period T1 except a first sub period t1 in the second period T2. The display panel simultaneously displays the black image B on every horizontal line during the first sub period t1. During a third period T3 next to the second period T2, the display panel 400 sequentially displays a first right-eye image R1 by the horizontal line unit along the forward scan direction. The display panel holds the first right-eye image R1 during a fourth period T4 next to the third period T3 except a second sub period t2 in the fourth period T4. The display panel simultaneously displays the black image B on every horizontal line during the second sub period t2.

During the fifth period T5 next to the fourth period T4, the display panel sequentially displays a second left-eye image L2 by the horizontal line unit along the reverse scan direction. The display panel holds the second left-eye image L2 during a sixth period T6 next to the fifth period T5 except a third sub period t3 in the sixth period T6. The display panel simultaneously displays the black image B on every horizontal line during the third sub period t3. During a seventh period T7 next to the sixth period T6, the display panel 400 sequentially displays a second right-eye image R2 by the horizontal line unit along the reverse scan direction. The display panel holds the second right-eye image R2 during an eighth period T8 next to the seventh period T7 except a fourth sub period t4 in the eighth period T8. The display panel simultaneously displays the black image B on every horizontal line during the fourth sub period t4.

As described above, according to the method of displaying the 3D image of the present exemplary embodiment, the scan direction is repeated by every 8 periods.

As shown in FIG. 10, the first left-eye image L1 and the first right-eye image R1 are sequentially displayed on the display panel along the forward scan direction. The 3D displaying period, in which the data signal of the first left-eye image L1 or the first right-eye image R1 is charged in the display panel, may be an inverted-trapezoid shape having an upper side being longer than a lower side. In addition, the second left-eye image L2 and the second right-eye image R2 are sequentially displayed on the display panel along the reverse scan direction. The 3D displaying period, in which the data signal of the second left-eye image L2 or the second right-eye image R2 is charged in the display panel, may be a trapezoid shape having the lower side being longer than the upper side. However, the black image B inserted between the 3D images having the forward scan direction may have a first black displaying period, in which the black data signal is charged in the display panel, such as a right triangle shape. In addition, the black image B inserted between the 3D images having the reverse scan direction may have a second black displaying period, in which the black data signal is charged in the display panel, such as an inverted right triangle shape.

According to the present exemplary embodiment, the 3D displaying period of the first left-eye image L1 has an opposite shape to the 3D displaying period of the second left-eye image L2 adjacent to a following black image B. In addition, the 3D displaying period of the first right-eye image R1 has an opposite shape to the 3D displaying period of the second right-eye image R2 adjacent to a following black image B.

According to the present exemplary embodiment, the scan direction of the left-eye or the right-eye image is opposite to the scan direction of the left-eye or the right-eye image adjacent to the following black image B. Thus, the 3D image having an upper area panel being brighter than a lower area in the display panel and the 3D having the lower area being brighter than the upper area in the display panel are uniformly displayed on the display panel. As a result, the 3D image may have a uniform luminance with respect to the whole display panel.

As described above, a scan period in which the left-eye or the right-eye image is scanned on the display panel is substantially the same as each period (e.g., T1), but not limited thereto. As dotted lines shown in FIG. 10, the scan period ST may be shorter than each period (e.g. T1). When the scan period ST is shorter than each period, the 3D displaying period of the left-eye or the right-eye image may be increased so that a display quality of the 3D image may be improved.

Figure 11:
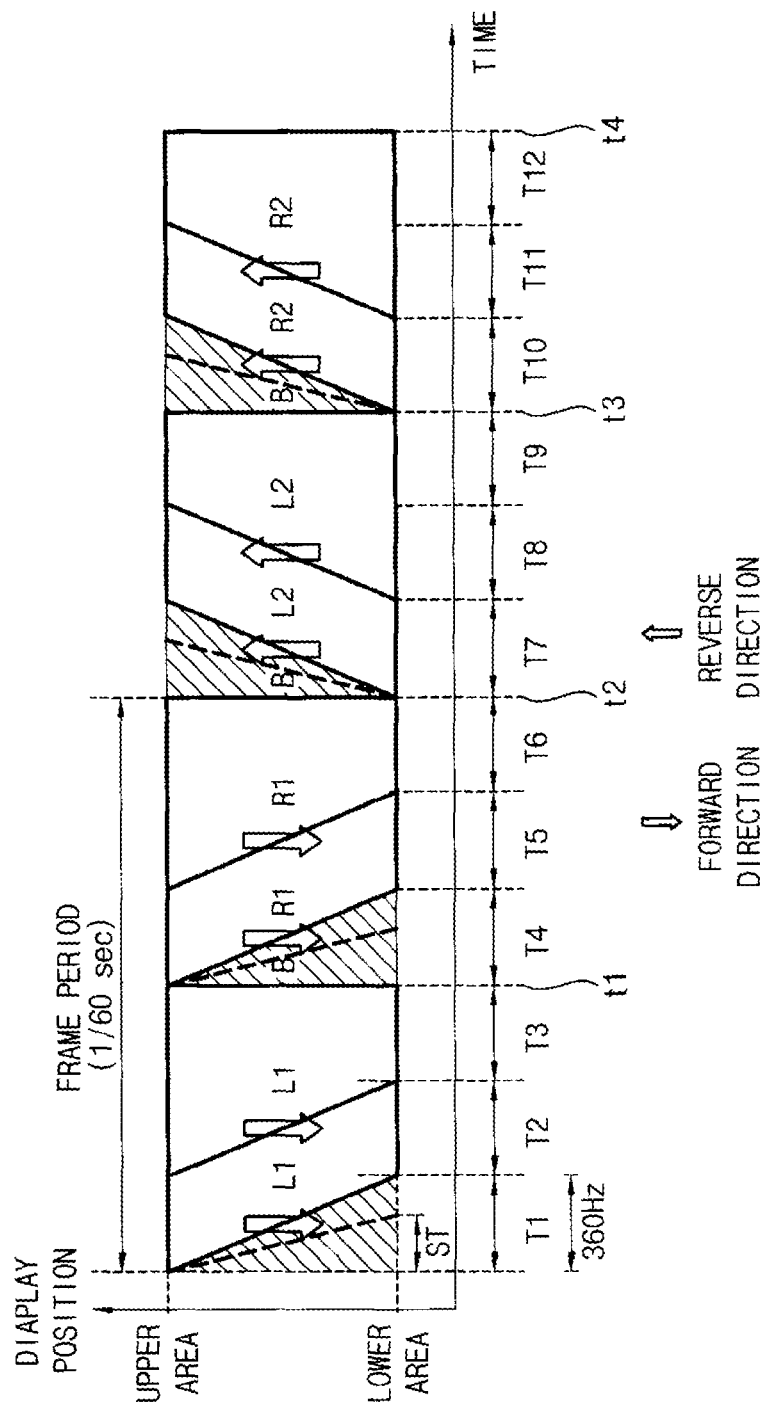
FIG. 11 is a conceptual diagram illustrating another alternative exemplary embodiment of a method of displaying a 3D image according to the invention.

FIG. 11 is a conceptual diagram illustrating another alternative exemplary embodiment of a method of displaying a 3D image according to the invention.

Referring to FIGS. 1 and 11, the method of displaying a 3D image on the display panel with the frame frequency of 360 Hz by the panel driving part will be explained. In the present exemplary embodiment, a frame period may be referred to as 1/60 sec. and each period may be referred to as 1/6 frame period.

According to the present exemplary embodiment, the frame rate controller 300 as shown in FIG. 1, respectively repeats the left-eye data frame and the right-eye data frame three times based on the frame frequency of 360 Hz, and sequentially output three left-eye data frames and three right-eye data frames.

Based on an output of the frame rate controller 300, the panel driving part 500 displays the 3D image on the display panel 400.

For example, during a first period T1, the display panel sequentially displays a first left-eye image L1 by the horizontal line unit along the forward scan direction. During a second period T2 next to the first period T1, the display panel repetitively displays the first left-eye image L1 by the horizontal line unit along the forward scan direction. The display panel holds the first left-eye image L1 during a third period T3 next to the second period T2 except a first sub period t1 in the third period T3. During the first sub period t1, the display panel simultaneously displays the black image B on every horizontal line. During a fourth period T4 next to the third period T3, the display panel sequentially displays a first right-eye image R1 by the horizontal line unit along the forward scan direction. During a fifth period T5 next to the fourth period T4, the display panel repetitively displays the first right-eye image R1 by the horizontal line unit along the forward scan direction. The display panel holds the first right-eye image R1 during a sixth period T6 except a second sub period t2 in the sixth period T6. During the second sub period t2, the display panel simultaneously displays the black image B on every horizontal line.

During a seventh period T7 next to the sixth period T6, the display panel sequentially displays a second left-eye image L2 by the horizontal line unit along the reverse scan direction. During an eighth period T8 next to the seventh period T7, the display panel repetitively displays the second left-eye image L2 by the horizontal line unit along the reverse scan direction. The display panel holds the second left-eye image L2 during a ninth period T9 next to the eighth period T8 except a third sub period t3 in the ninth period T9. During the third sub period t3, the display panel simultaneously displays the black image B on every horizontal line. During a tenth period T10 next to the ninth period T9, the display panel sequentially displays a second right-eye image R2 by the horizontal line unit along the reverse scan direction. During an eleventh period T11 next to the tenth period T10, the display panel repetitively displays the second right-eye image R2 by the horizontal line unit along the reverse scan direction. The display panel holds the second right-eye image R2 during a twelfth period T12 except a fourth sub period t4 of the twelfth period T12. During the fourth sub period t4, the display panel simultaneously displays the black image B on every horizontal line.

As described above, according to the method of displaying the 3D image of the present exemplary embodiment, the scan direction is repeated by every 12 periods.

As shown in FIG. 11, the first left-eye image L1 and the first right-eye image R1 are sequentially displayed on the display panel along the forward scan direction. The 3D displaying period, in which the data signal of the first left-eye image L1 or the first right-eye image R1 is charged in the display panel, may be an inverted-trapezoid shape having an upper side being longer than a lower side. In addition, the second left-eye image L2 and the second right-eye image R2 are sequentially displayed on the display panel along the reverse direction. The 3D displaying period, in which the data signal of the second left-eye image L2 or the second right-eye image R2 is charged in the display panel, may be a trapezoid shape having the lower side being longer than the upper side. However, the black image B inserted between the 3D images having the forward scan direction may have a first black displaying period, in which the black data signal is charged in the display panel, such as a right triangle shape. In addition, the black image B inserted between the 3D images having the reverse scan direction may have a second black displaying period, in which the black data signal is charged in the display panel, such as an inverted right triangle shape.

According to the present exemplary embodiment, the 3D displaying period of the first left-eye image L1 has an opposite shape to the 3D displaying period of the second left-eye image L2 adjacent to a following black image B. In addition, the 3D displaying period of the first right-eye image R1 has an opposite shape to the 3D displaying period of the second right-eye image R2 adjacent to a following black image B.

According to the present exemplary embodiment, the scan direction of the left-eye or the right-eye image is opposite to the scan direction of the left-eye or the right-eye image adjacent to the following black image B. Thus, the 3D image having an upper area panel being brighter than a lower area in the display panel and the 3D having the lower area being brighter than the upper area in the display panel are uniformly displayed on the display panel. As a result, the 3D image may have a uniform luminance with respect to the whole display panel.

As described above, a scan period in which the left-eye or the right-eye image is scanned on the display panel is substantially the same as each period (e.g., T1), but not limited thereto. As dotted lines shown in FIG. 11, the scan period ST may be shorter than each period (e.g. T1). When the scan period ST is shorter than each period, the 3D displaying period of the left-eye or the right-eye image may be increased so that a display quality of the 3D image may be improved.

Figure 12:
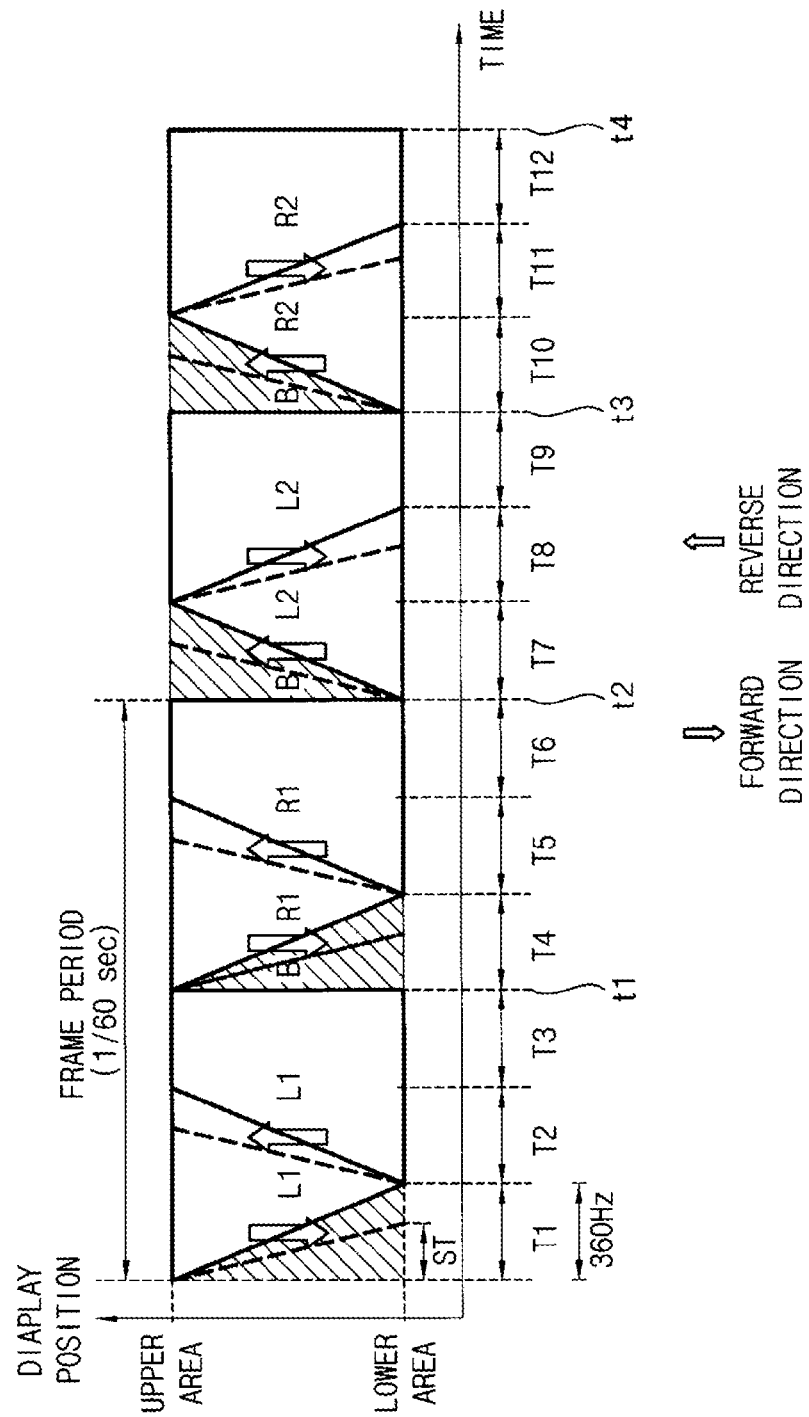
FIG. 12 is a conceptual diagram illustrating another alternative exemplary embodiment of a method of displaying a 3D image according to the invention.

FIG. 12 is a conceptual diagram illustrating another alternative exemplary embodiment of a method of displaying a 3D image according to the invention.

Referring to FIG. 12, the method of displaying a 3D image on the display panel with the frame frequency of 360 Hz by the panel driving part will be explained. In the present exemplary embodiment, a frame period may be referred to as 1/60 sec. and each period may be referred to as 1/6 frame period.

During a first period T1, the display panel sequentially displays a first left-eye image L1 by the horizontal line unit along the forward scan direction. During a second period T2 next to the first period T1, the display panel repetitively displays the first left-eye image L1 by the horizontal line unit along the reverse scan direction. The display panel holds the first left-eye image L1 a third period T3 next to the second period T2 except a first sub period t1 in the third period T3. During the first sub period t1, the display panel simultaneously displays the black image B on every horizontal line. During a fourth period T4 next to the third period T3, the display panel sequentially displays a first right-eye image R1 by the horizontal line unit along the forward scan direction. During a fifth period T5 next to the fourth period T4, the display panel repetitively displays the first right-eye image R1 by the horizontal line unit along the reverse scan direction. The display panel holds the first right-eye image R1 during a sixth period T6 except a second sub period t2 in the sixth period T6. During the second sub period t2, the display panel simultaneously displays the black image B on every horizontal line.

During a seventh period T7 next to the sixth period T6, the display panel sequentially displays a second left-eye image L2 by the horizontal line unit along the reverse scan direction. During an eighth period T8 next to the seventh period T7, the display panel repetitively displays the second left-eye image L2 by the horizontal line unit along the forward scan direction. The display panel holds the second left-eye image L2 during a ninth period T9 next to the eighth period T8 except a third sub period t3 in the ninth period T9. During the third sub period t3, the display panel simultaneously displays the black image B on every horizontal line. During a tenth period T10 next to the ninth period T9, the display panel sequentially displays a second right-eye image R2 by the horizontal line unit along the reverse scan direction. During an eleventh period T11 next to the tenth period T10, the display panel repetitively displays the second right-eye image R2 by the horizontal line unit along the forward scan direction. The display panel holds the second right-eye image R2 during a twelfth period T12 except a fourth sub period t4 in the twelfth period T12. During the fourth sub period t4, the display panel simultaneously displays the black image B on every horizontal line.

As described above, according to the method of displaying the 3D image of the present exemplary embodiment, the scan direction is repeated by every 3 period.

According to the present exemplary embodiment, the 3D displaying period of the first left-eye image L1 has an opposite shape to the 3D displaying period of the second left-eye image L2 adjacent to a following black image B. In addition, the 3D displaying period of the first right-eye image R1 has an opposite shape to the 3D displaying period of the second right-eye image R2 adjacent to a following black image B.

In the display panel with the frame frequency of 360 Hz, the scan direction of the left-eye or the right-eye image may be variously preset to be opposite to the scan direction of the left-eye or the right-eye image adjacent to a following black image.

As described above, a scan period in which the left-eye or the right-eye image is scanned on the display panel is substantially the same as each period (e.g., T1), but not limited thereto. As dotted lines shown in FIG. 12, the scan period ST may be shorter than each period (e.g. T1). When the scan period ST is shorter than each period, the 3D displaying period of the left-eye or the right-eye image may be increased so that a display quality of the 3D image may be improved.

Figure 13:
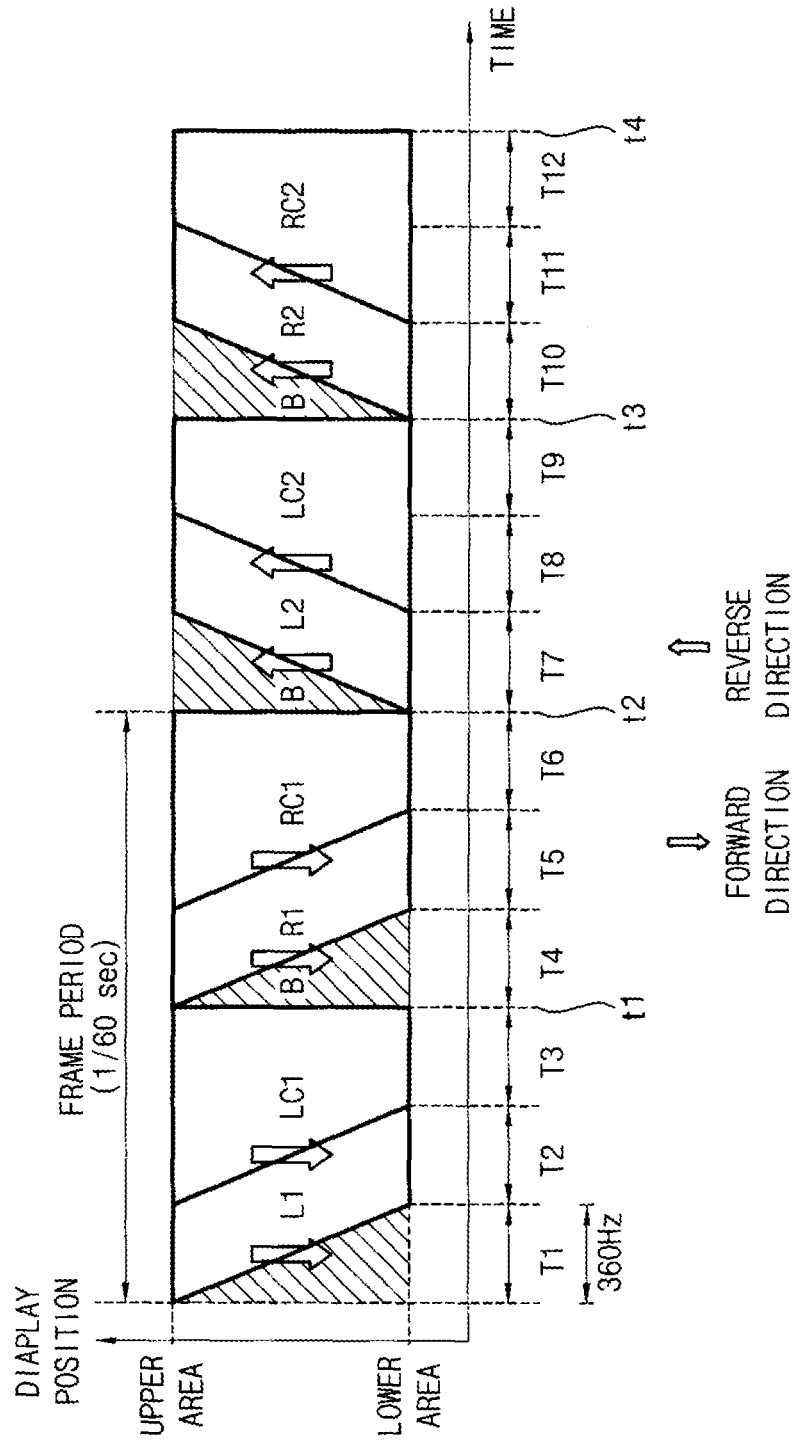
FIG. 13 is a conceptual diagram illustrating another alternative exemplary embodiment of a method of displaying a 3D image according to the invention.

FIG. 13 is a conceptual diagram illustrating another alternative exemplary embodiment of a method of displaying a 3D image according to the invention.

Referring to FIGS. 1 and 13, the method of displaying a 3D image on the display panel with the frame frequency of 360 Hz by the panel driving part will be explained. In the present exemplary embodiment, a frame period may be referred to as 1/60 sec. and each period may be referred to as 1/6 frame period.

According to exemplary embodiment, the data correcting part 210 as shown in FIG. 1, generates a correcting left-eye data frame and a correcting right-eye data frame using left-eye and right-eye data frames received from the frame rate controller 300 in order to improve a response time of the left-eye data frame and the right-eye data frame.

For example, the data correcting part 210 generates the correcting left-eye data frame corresponding to a present left-eye data frame using a previous left-eye data frame and generates the correcting right-eye data frame corresponding to a present right-eye data frame using a previous right-eye data frame. The left-eye data frame is data of a left-eye image L, the correcting left-eye data frame is data of a correcting left-eye image LC, the right-eye data frame is data of a right-eye image R and the correcting right-eye data frame is data of a correcting right-eye image RC.

Based on an output of the data correcting part, the panel driving part 500 displays the 3D image on the display panel 400.

For example, during a first period T1, the display panel sequentially displays a first left-eye image L1 by the horizontal line unit along the forward scan direction. During a second period T2 next to the first period T1, the display panel displays a first correcting left-eye image LC1 by the horizontal line unit along the forward scan direction. The display panel holds the first correcting left-eye image LC1 during a third period T3 next to the second period T2 except a first sub period t1 in the third period T3. During the first sub period t1, the display panel simultaneously displays the black image B on every horizontal line. During a fourth period T4 next to the third period T3, the display panel sequentially displays a first right-eye image R1 by the horizontal line unit along the forward scan direction. During a fifth period T5 next to the fourth period T4, the display panel displays a first correcting right-eye image RC1 by the horizontal line unit along the forward scan direction. The display panel holds the first correcting right-eye image RC1 during a sixth period T6 except a second sub period t2 in the sixth period T6. During the second sub period t2, the display panel simultaneously displays the black image B on every horizontal line.

During a seventh period T7 next to the sixth period T6, the display panel sequentially displays a second left-eye image L2 by the horizontal line unit along the reverse scan direction. During an eighth period T8 next to the seventh period T7, the display panel displays a second correcting left-eye image LC2 by the horizontal line unit along the reverse scan direction. The display panel holds the second correcting left-eye image LC2 during a ninth period T9 next to the eighth period T8 except a third sub period t3 in the ninth period T9. During the third sub period t3, the display panel simultaneously displays the black image B on every horizontal line. During a tenth period T10 next to the ninth period T9, the display panel sequentially displays a second right-eye image R2 by the horizontal line unit along the reverse scan direction. During an eleventh period T11 next to the tenth period T10, the display panel displays a second correcting right-eye image RC2 by the horizontal line unit along the reverse scan direction. The display panel holds the second correcting right-eye image RC2 during a a twelfth period T12 except a fourth sub period t4 in the twelfth period T12. During the fourth sub period t4, the display panel simultaneously displays the black image B on every horizontal line.

As described above, according to the method of displaying the 3D image of the present exemplary embodiment, the scan direction is repeated by every 12 periods.

As shown in FIG. 13, the first left-eye image L1 and the first correcting left-eye image LC1 are sequentially displayed on the display panel along the forward direction. The 3D displaying period, in which the data signal of the first left-eye image L1 or the first correcting left-eye image LC1 is charged in the display panel, may be an inverted-trapezoid shape having an upper side being longer than a lower side. In addition, the second left-eye image L2 and the second correcting left-eye image LC2 are sequentially displayed on the display panel along the reverse direction. The 3D displaying period, in which the data signal of the second left-eye image L2 or the second correcting left-eye image LC2 is charged in the display panel, may be a trapezoid shape having the lower side being longer than the upper side.

According to the present exemplary embodiment, the 3D displaying period of the first left-eye image L1 and LC1 has an opposite shape to the 3D displaying period of the second left-eye image L2 and LC2 adjacent to a following black image B. In addition, the 3D displaying period of the first right-eye image R1 and RC1 has an opposite shape to the 3D displaying period of the second right-eye image R2 and RC2 adjacent to a following black image B.

According to the present exemplary embodiment, the scan direction of the left-eye or the right-eye image is opposite to the scan direction of the left-eye or the right-eye image adjacent to the following black image B. Thus, the 3D image having an upper area panel being brighter than a lower area in the display panel and the 3D having the lower area being brighter than the upper area in the display panel are uniformly displayed on the display panel.

As a result, the 3D image may have a uniform luminance with respect to the whole display panel. In addition, the correcting left-eye or the correcting right-eye image is sequentially displayed after the left-eye or the right-eye image is displayed so that the response time of the 3D image may be improved.

Figure 14:
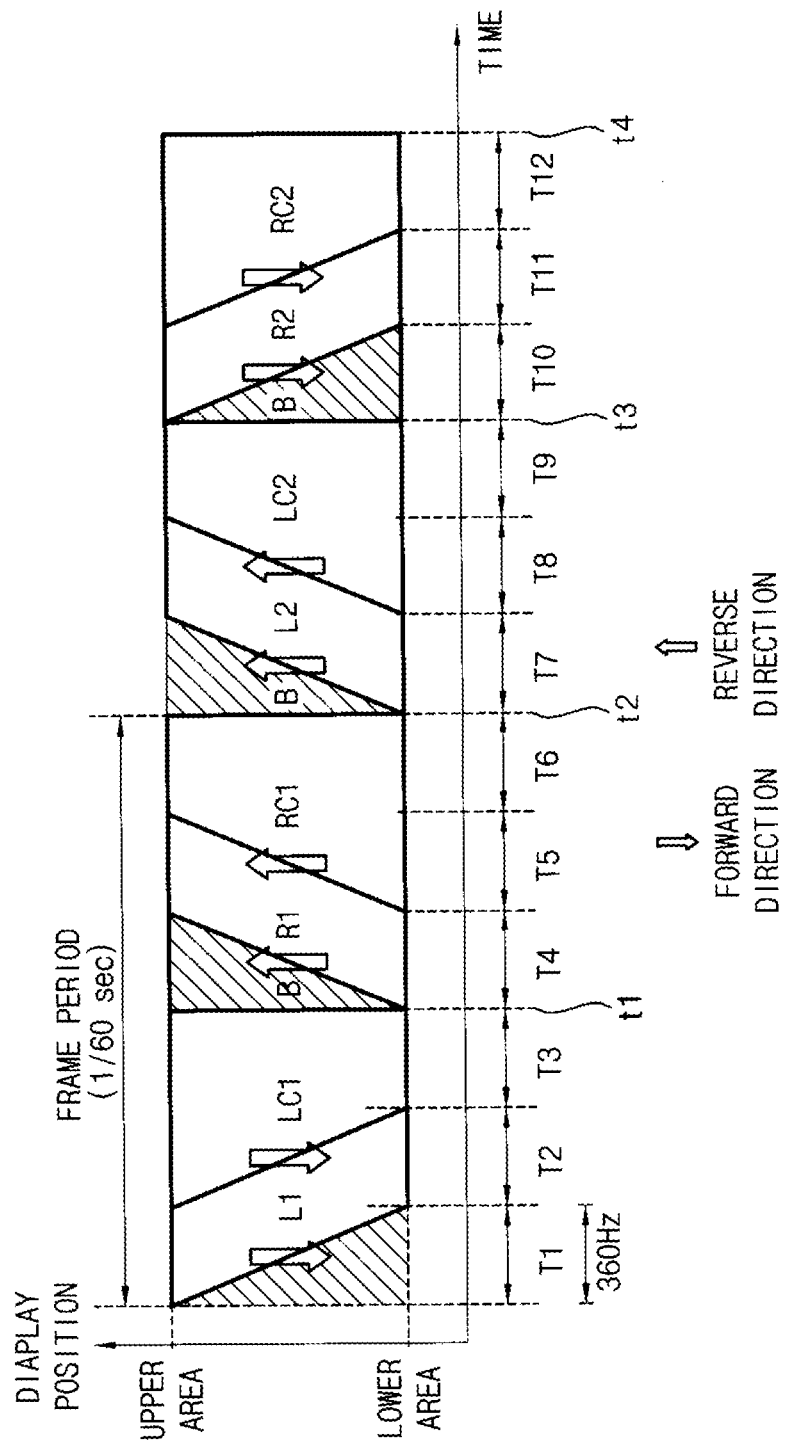
FIG. 14 is a conceptual diagram illustrating another alternative exemplary embodiment of a method of displaying a 3D image according to the invention.

FIG. 14 is a conceptual diagram illustrating another alternative exemplary embodiment of a method of displaying a 3D image according to the invention.

Referring to FIG. 14, the method of displaying the 3D image according to the present exemplary embodiment is substantially the same as that of the previous exemplary embodiment as shown in FIG. 13, except for the scan direction of right-eye images R1, RC1, R2 and RC2, and the same detailed explanations are not repeated unless necessary.

For example, during a fourth period T4 next to the third period T3, the display panel sequentially displays a first right-eye image R1 by the horizontal line unit along the reverse scan direction. During a fifth period T5 next to the fourth period T4, the display panel displays a first correcting right-eye image RC1 by the horizontal line unit along the reverse scan direction. The display panel holds the first correcting right-eye image RC1 during a sixth period T6 next to the fifth period T5 except a second sub period t2 in the sixth period T6. During the second sub period t2, the display panel simultaneously displays the black image B on every horizontal line.

During a tenth period T10 next to the ninth period T9, the display panel sequentially displays a second right-eye image R2 by the horizontal line unit along the forward scan direction. During an eleventh period T11 next to the tenth period T10, the display panel displays a second correcting right-eye image RC2 by the horizontal line unit along the forward scan direction. The display panel holds the second correcting right-eye image RC2 during a twelfth period T12 next to the eleventh period T11 except a fourth sub period t4 in the twelfth period T12. During the fourth sub period t4, the display panel simultaneously displays the black image B on every horizontal line.

As described above, according to the method of displaying the 3D image of the present exemplary embodiment, the scan direction is repeated by every 12 periods.

According to the present exemplary embodiment, the 3D displaying period of the left-eye images L1 and LC1 has an opposite shape to the left-eye images L2 and LC2 adjacent to a following black image B. In addition, the 3D displaying period of the right-eye images R1 and RC1 has an opposite shape to the right-eye images R2 and RC2 adjacent to a following black image B.

According to the present exemplary embodiment, the scan direction of the left-eye or the right-eye image is opposite to the scan direction of the left-eye or the right-eye image adjacent to a following black image. Thus, the 3D image having an upper area panel being brighter than a lower area in the display panel and the 3D having the lower area being brighter than the upper area in the display panel are uniformly displayed on the display panel.

As a result, the 3D image may have a uniform luminance with respect to the whole display panel. In addition, the correcting left-eye or the correcting right-eye image is sequentially displayed after the left-eye or the right-eye image is displayed so that the response time of the 3D image may be improved.

Figure 15:
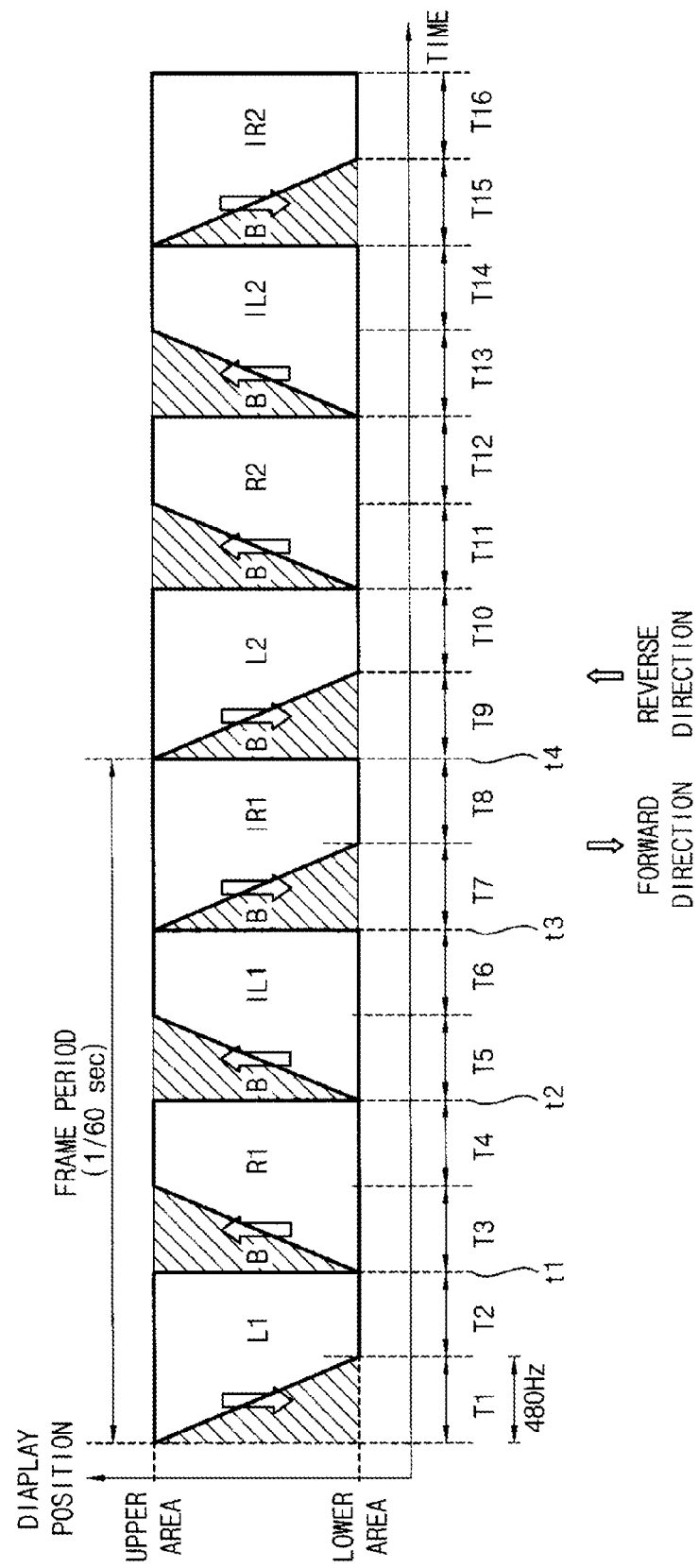
FIG. 15 is a conceptual diagram illustrating another alternative exemplary embodiment of a method of displaying a 3D image according to the invention.

FIG. 15 is a conceptual diagram illustrating another alternative exemplary embodiment of a method of displaying a 3D image according to the invention.

Referring to FIGS. 1 and 15, the method of displaying a 3D image on the display panel with the frame frequency of 480 Hz by the panel driving part will be explained. In the present exemplary embodiment, a frame period may be referred to as 1/60 sec. and each period may be referred to as 1/8 frame period.

According to the present exemplary embodiment, the frame rate controller 300 as shown in FIG. 1 respectively repeats the left-eye data frame and the right-eye data frame one time on the frame frequency of 480 Hz. In addition, the frame rate controller 300 generates an interpolation left-eye data frame or an interpolation right-eye data frame corresponding to the left-eye or the right-eye data frame using motion estimation and motion compensation ("MEMC") mode, and respectively repeats the interpolation left-eye data frame or the interpolation right-eye data frame one time. Therefore, the frame rate controller 300 sequentially outputs two left-eye data frames, two right-eye data frames, two interpolation left-eye data frames and two interpolation right-eye data frames.

Based on an output of the frame rate controller 300, the panel driving part 500 display the 3D image on the display panel 400.

During a first period T1, the display panel sequentially displays a first left-eye image L1 by the horizontal line unit along the forward scan direction. The display panel holds the first left-eye image L1 during a second period T2 next to the first period T1 except a first sub period t1 in the second period T2. The display panel simultaneously displays the black image B on every horizontal line during the first sub period t1. During a third period T3 next to the second period T2, the display panel 400 sequentially displays a first right-eye image R1 by the horizontal line unit along the reverse scan direction. The display panel holds the first right-eye image R1 during a fourth period T4 next to the third period T3 except a second sub period t2 in the fourth period T4. The display panel simultaneously displays the black image B on every horizontal line during the second sub period t2.

During the fifth period T4 next to the fourth period T4, the display panel sequentially displays a first interpolation left-eye image IL1 by the horizontal line unit along the reverse scan direction. The display panel holds the first interpolation left-eye image IL1 during a sixth period T6 next to the fifth period T5 except a third sub period t3 in the sixth period T6. The display panel simultaneously displays the black image B on every horizontal line during the third sub period t3. During a seventh period T7 next to the sixth period T6, the display panel 400 sequentially displays a first interpolation right-eye image IR1 by the horizontal line unit along the forward scan direction. The display panel holds the first interpolation right-eye image IR1 during an eighth period T8 next to the seventh period T7 except a fourth sub period t4 in the eighth period T8. The display panel simultaneously displays the black image B on every horizontal line during the fourth sub period t4.

As described above, during ninth to sixteenth periods, the display panel displays a second left-eye image L2, the black image B, a second right-eye image R2, the black image B, a second interpolation left-eye image IL2, the black image B, the second interpolation right-eye image IR2 and the black image B.

According to the method of displaying the 3D image of the present exemplary embodiment, the scan direction of the 3D image is repeated by every 8 periods.

According to the present exemplary embodiment, the 3D displaying period of the first left-eye image L1 has an opposite shape to the 3D displaying period of the first interpolation left-eye image LI1 adjacent to a following black image B. In addition, the 3D displaying period of the first right-eye image R1 has an opposite shape to the 3D displaying period of the first interpolation right-eye image RI1 adjacent to a following black image B.

According to the present exemplary embodiment, the scan direction of the first left-eye image L1 is opposite to the scan direction of the first interpolation left-eye image LI1 adjacent to the following black image B, and the scan direction of the first right-eye image R1 is opposite to the scan direction of the first interpolation right-eye image RH adjacent to the following black image B.

In addition, the scan direction of the second left-eye image L2 is opposite to the scan direction of the second interpolation left-eye image IL2 adjacent to the following black image B, and the scan direction of the second right-eye image R2 is opposite to the scan direction of the second interpolation right-eye image IR2 adjacent to the following black image B.

Thus, the 3D image having an upper area panel being brighter than a lower area in the display panel and the 3D having the lower area being brighter than the upper area in the display panel are uniformly displayed on the display panel. As a result, the 3D image may have a uniform luminance with respect to the whole display panel.

In the display panel with the frame frequency of 480 Hz, the scan direction of the left-eye or the right-eye image may be variously preset to be opposite to the scan direction of the left-eye or the right-eye image adjacent to a following black image.

Figure 16:
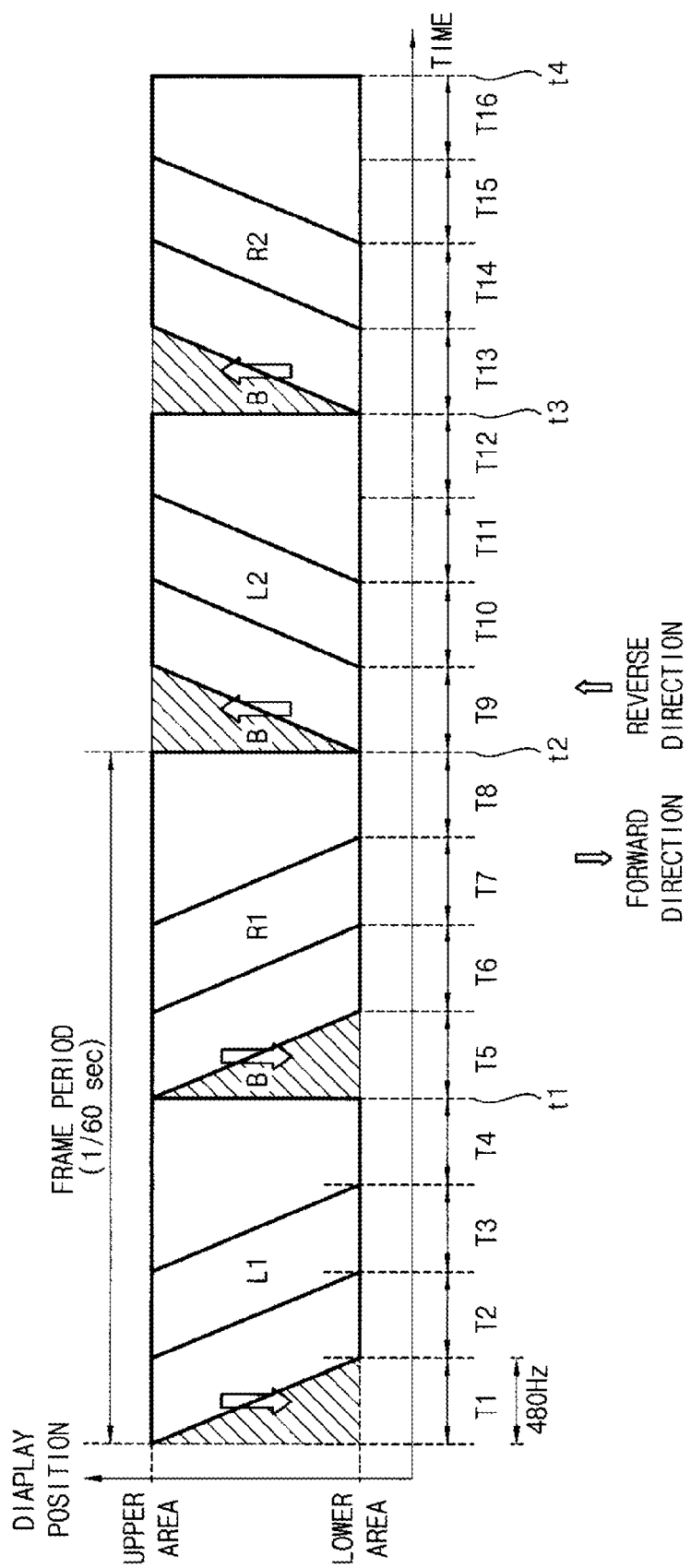
FIG. 16 is a conceptual diagram illustrating another alternative exemplary embodiment of a method of displaying a 3D image according to the invention.

FIG. 16 is a conceptual diagram illustrating another alternative exemplary embodiment of a method of displaying a 3D image according to the invention.

Referring to FIG. 16, the method of displaying a 3D image on the display panel with the frame frequency of 480 Hz by the panel driving part will be explained. In the present exemplary embodiment, a frame period may be referred to as 1/60 sec. and each period may be referred to as 1/8 frame period.

According the present exemplary embodiment, the frame rate controller 300 as shown in FIG. 1, respectively repeats the left-eye data frame and the right-eye data frame three times based on the frame frequency of 480 Hz. The frame rate controller 300 according to the present exemplary embodiment is not used the MEMC method. In other word, the frame rate controller 300 sequentially outputs four left-eye data frames being the same as each other and four right-eye data frames being the same as each other.

Based on an output of the frame rate controller 300, the panel driving part 500 displays the 3D image on the display panel 400.

For example, during a first period T1, the display panel sequentially displays a first left-eye image L1 by the horizontal line unit along the forward scan direction. The display panel repetitively displays the first left-eye image L1 along the forward scan direction during second and third periods T2 and T3. The display panel holds the first left-eye image L1 during a fourth period T4 next to the third period T3 except a first sub period t1 in the fourth period T4. The display panel simultaneously displays the black image B on every horizontal line during the first sub period t1. During a fifth period T5, the display panel sequentially displays a first right-eye image R1 by the horizontal line unit along the forward scan direction. The display panel repetitively displays the first right-eye image R1 along the forward scan direction during sixth and seventh periods T6 and T7. The display panel holds the first right-eye image R1 during an eighth period T8 next to the seventh period T7 except a second sub period t2 in the eighth period T8. The display panel simultaneously displays the black image B on every horizontal line during the first sub period t1.

Then, during a ninth period T9, the display panel sequentially displays a second left-eye image L2 by the horizontal line unit along the reverse scan direction. The display panel repetitively displays the second left-eye image L2 along the reverse scan direction during tenth and eleventh periods T10 and T11. The display panel holds the second left-eye image L2 during a twelfth period T12 next to the eleventh period T11 except a third sub period t3 in the twelfth period T12. The display panel simultaneously displays the black image B on every horizontal line during the third sub period t3. During a thirteenth period next to the twelfth period T12, the display panel sequentially displays a second right-eye image R2 by the horizontal line unit along the reverse scan direction. The display panel repetitively displays the second right-eye image R2 along the reverse scan direction during fourteenth and fifteenth periods T14 and T15. The display panel holds the second right-eye image R2 during a sixteenth period T16 next to the fifteenth period T15 except a fourth sub period t4 in the sixteenth period T16. The display panel simultaneously displays the black image B on every horizontal line during the fourth sub period t4.

According to the method of displaying the 3D image of the present exemplary embodiment, the scan direction of the 3D image is repeated by every 16 periods.

According to the present exemplary embodiment, the 3D displaying period of the first left-eye image L1 has an opposite shape to the second left-eye image L2 adjacent to the following black image B. In addition, the 3D displaying period of the first right-eye image R1 has an opposite shape to the second right-eye image R2 adjacent to the following black image B.

According to the present exemplary embodiment, the scan direction of the left-eye or the right-eye image is opposite to the scan direction of the left-eye or the right-eye image adjacent to the following black image B.

Thus, the 3D image having an upper area panel being brighter than a lower area in the display panel and the 3D having the lower area being brighter than the upper area in the display panel are uniformly displayed on the display panel. As a result, the 3D image may have a uniform luminance with respect to the whole display panel.

As described above, a scan period in which the left-eye or the right-eye image is scanned on the display panel is substantially the same as each period (e.g., T1), but not limited thereto. As dotted lines shown in FIG. 9, the scan period ST may be shorter than each period (e.g. T1). When the scan period ST is shorter than each period, the 3D displaying period of the left-eye or the right-eye image may be increased so that a display quality of the 3D image may be improved.

Figure 17:
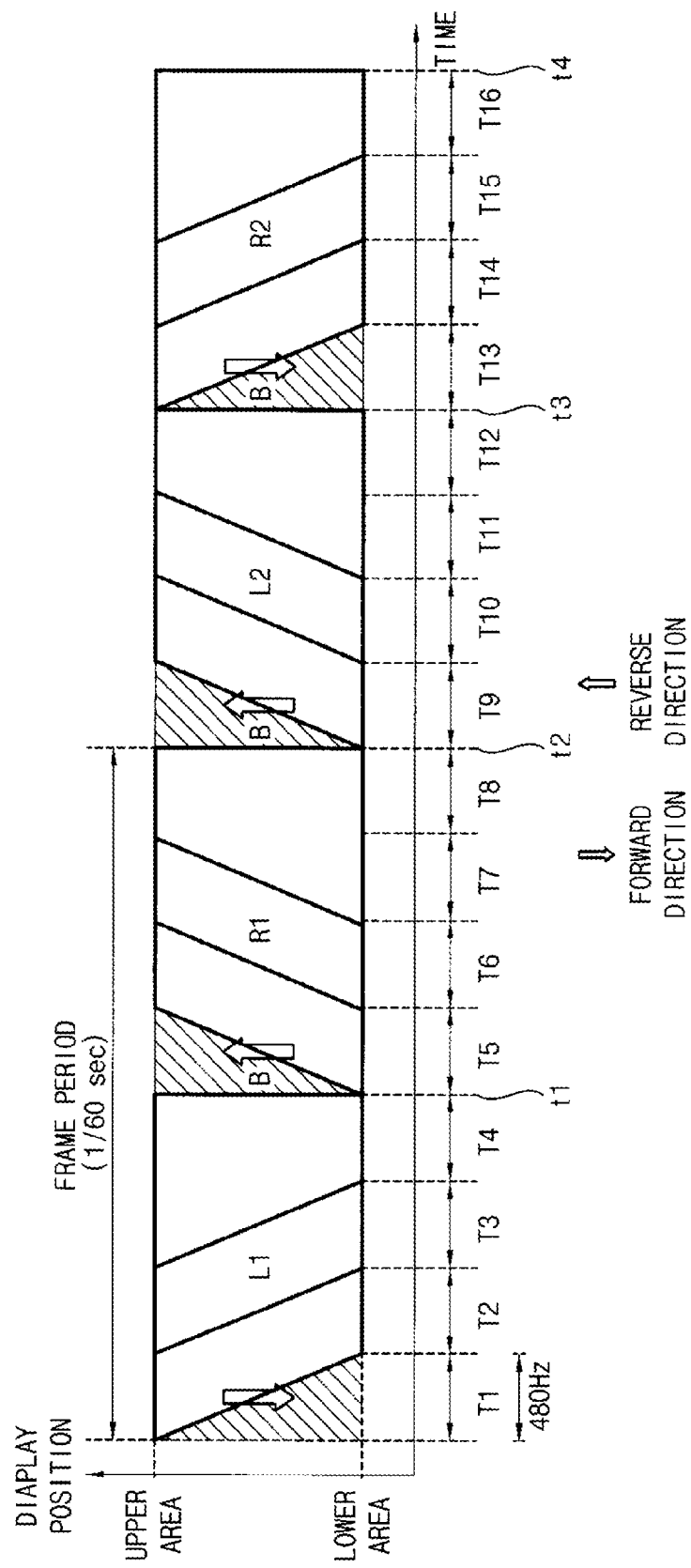
FIG. 17 is a conceptual diagram illustrating another alternative exemplary embodiment of a method of displaying a 3D image according to the invention.

FIG. 17 is a conceptual diagram illustrating another alternative exemplary embodiment of a method of displaying a 3D image according to the invention.

Referring to FIG. 17, the method of displaying the 3D image on the display panel with the frame frequency of 480 Hz according to the present exemplary embodiment is substantially the same as that of the previous exemplary embodiment shown in FIG. 16, except to for scan directions of the first right-eye image R1 and the second right-eye image R2.

For example, during first period, second and third periods T1, T2 and T3, the display panel repetitively displays the first left-eye image L1 along the forward scan direction. The display panel holds the first left-eye image L1 during a fourth period T4 next to the third period T3 except a first sub period t1 in the fourth period T4. The display panel simultaneously displays the black image B on every horizontal line during the first sub period t1. During the fifth, sixth and seventh periods T5, T6 and T7 next to the fourth period T4, the display panel repetitively displays the first right-eye image R1 along the reverse scan direction. The display panel holds the first right-eye image R1 during an eighth period T8 next to the seventh period T7 except a second sub period t2 in the eighth period T8. The display panel simultaneously displays the black image B on total horizontal lines during the second sub period t2.

Then, during ninth, tenth and eleventh periods T9, T10 and T11, the display panel repetitively displays the second left-eye image L2 along the reverse scan direction. The display panel holds the second left-eye image L2 during a twelfth period T12 next to the eleventh period T11 except a third sub period t3 in the twelfth period T12. The display panel simultaneously displays the black image B on every horizontal line during the third sub period t3. During a thirteenth, fourteenth and fifteenth periods T13, T14 and T15 next to the twelfth period T12, the display panel repetitively displays the second right-eye image R2 along the forward scan direction during fourteenth and fifteenth periods T14 and T15. The display panel holds the second right-eye image R2 during a sixteenth period T16 next to the fifteenth period T15 except a fourth sub period t4 in the sixteenth period T16. The display panel simultaneously displays the black image B on every horizontal line during the fourth sub period t4.

According to the method of displaying the 3D image of the present exemplary embodiment, the scan direction of the 3D image is repeated by every 32 periods.

According to the present exemplary embodiment, the 3D displaying period of the first left-eye image L1 has an opposite shape to the second left-eye image L2 adjacent to the following black image B. In addition, the 3D displaying period of the first right-eye image R1 has an opposite shape to the second right-eye image R2 adjacent to the following black image B.

According to the present exemplary embodiment, the scan direction of the left-eye or the right-eye image is opposite to the scan direction of the left-eye or the right-eye image adjacent to the following black image B. Thus, the 3D image having an upper area panel being brighter than a lower area in the display panel and the 3D having the lower area being brighter than the upper area in the display panel are uniformly displayed on the display panel. As a result, the 3D image may have a uniform luminance with respect to the whole display panel.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:
1. A method of displaying three-dimensional images, the method comprising:
   sequentially displaying a first three-dimensional image on a plurality of horizontal lines of a display panel along a scan direction; and simultaneously displaying a black image on the plurality of horizontal lines of the display panel,
wherein the black image is inserted between the three-dimensional images having different images, and
wherein a duration of displaying the black image changes along a direction from an upper area to a lower area of the display panel.

2. The method of claim 1, further comprising sequentially displaying a second three-dimensional image on a plurality of horizontal lines of the display panel along a reverse scan direction.

3. The method of claim 2,
wherein the first three-dimensional image is a first left-eye frame image, and
wherein the second three-dimensional image is a first right-eye image.

4. The method of claim 3,
further comprising a third three-dimensional image and a fourth three-dimensional image,
wherein the third three-dimensional image is a second right-eye frame image having the reverse scan direction and the fourth three-dimensional image is a second left-eye frame image having the forward scan direction.

5. The method of claim 2,
wherein the first three-dimensional image is a first right-eye frame image, and
wherein the second three-dimensional image is a first left-eye image.

6. The method of claim 1,
further comprising sequentially displaying a second three-dimensional image on a plurality of horizontal lines of the display panel along a scan direction,
wherein the first three-dimensional image is a first left-eye frame image and the second three-dimensional image is a first right-eye image.

7. The method of claim 6,
further comprising a third three-dimensional image and a fourth three-dimensional image,
wherein the third three-dimensional image is a second left-eye frame image having the forward scan direction and a fourth three-dimensional image is a second right-eye frame image having the forward scan direction.

8. The method of claim 1, further comprising:
correcting a three-dimensional image data using a plurality of look-up tables having predetermined correction data corresponding to a plurality of space areas, the display panel being divided into the plurality of the space areas along the scan direction.

9. The method of claim 8,
wherein the plurality of look-up tables have a predetermined correction data, and
wherein the predetermined correction data of the space area near a starting point of scanning have a lower gray scale than the predetermined correction data of the space area away from a starting point of scanning.

10. A display apparatus comprising:
a display panel including a plurality of gate lines and a plurality of data lines;
a three-dimensional processing part generating three-dimensional image data including a left-eye data frame and a right-eye data frame; and
a panel driving part sequentially displaying a three-dimensional image on a plurality of horizontal lines of the display panel along a scan direction using the three-dimensional image data, and displaying a black image on the horizontal lines of the display panel, the black image being inserted between three-dimensional images being different from each other,
wherein a duration of displaying the black image changes along a direction from an upper area to a lower area of the display panel.

11. The display apparatus of claim 10, wherein the panel driving part comprises:
a data driving part sequentially outputting a left-eye data signal of a left-eye data frame to the display panel by a horizontal period unit during a first period, outputting a black data signal to the display panel during a first sub period of a second period, sequentially outputting a right-eye data signal of a right-eye data frame to the display panel by a horizontal period unit during a third period and outputting a black data signal to the display panel during a second sub period of a fourth period, and
a gate driving part sequentially outputting a gate on signal to the gate lines of the display panel during the first period, simultaneously outputting the gate on signal to the gate lines of the display panel during the first sub period of the second period, sequentially outputting the gate one signal to the gate lines of the display panel during the third period, and simultaneously outputting the gate on signal to the gate lines of the display panel during the second sub period of the fourth period.

12. The display apparatus of claim 11, wherein the gate on signals simultaneously output to the gate lines during the first sub period and the second sub period have a pulse width being the same as each other.

13. The display apparatus of claim 11, further comprising:
a timing control part controlling the gate driving part in order that gate driving part outputs the gate on signal during the first and second sub periods.

14. The display apparatus of claim 13, wherein the gate driving part comprises:
an off line transferring a gate off voltage;
a first voltage terminal connected to the off line and receiving the gate off voltage;
a second voltage terminal receiving a gate on voltage;
an output part outputting the gate on voltage into the gate on signal; and
a holding part outputting the gate off voltage into a gate off signal.

15. The display apparatus of claim 14, further comprising:
a switching part connected to the off line, and selectively providing the off line with the gate on voltage and the gate off voltage,
wherein the timing control part controls the switching part in order that the switching part provides the off line with the gate on signal during the first sub period and the second sub period.

16. The display apparatus of claim 13, wherein the gate driving part comprises:
a first voltage terminal receiving a gate off voltage;
a second voltage terminal receiving a gate on voltage;
an output part outputting the gate on voltage into the gate on signal;
a holding part outputting the gate off voltage into a gate off signal; and
a switching part connected between a node which is connected to the output part and the holding part and the second voltage terminal, and selectively outputs a voltage of the node and the gate on voltage based on a control of the timing control part.

17. The display apparatus of claim 11, further comprising:
a correcting part correcting a three-dimensional image data using a plurality of look-up tables corresponding to a plurality of space areas, the display panel being divided into the plurality of space areas along the scan direction.

18. The display apparatus of claim 10, wherein the panel driving part displays at least one data frame of a plurality of three-dimensional data frames on the display panel along a different scan direction from each other.

19. The display apparatus of claim 18, wherein the panel driving part controls the scan direction in order that a period in which a left-eye image or a right-eye image is displayed on the display panel has an opposite shape to a period in which the left-eye image or the right-eye image adjacent to a following black image is displayed on the display panel.

20. The display apparatus of claim 18, wherein the panel driving part controls the scan direction in order that the scan direction of the left-eye image or the right-eye image is opposite to the scan direction of the left-eye image or the right-eye image adjacent to a following black image.

* * * * *